US007859124B2

(12) United States Patent
Maier et al.

(10) Patent No.: US 7,859,124 B2
(45) Date of Patent: Dec. 28, 2010

(54) INTERNAL COMBUSTION ENGINE WITH ALTERNATOR

(75) Inventors: Georg Maier, Kernen i.R. (DE); Eberhard Schieber, Backnang (DE); Ina Weimer, Waiblingen (DE); Mohamed Abou-Aly, Waiblingen (DE); Heinrich Leufen, Schaikheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 587 days.

(21) Appl. No.: 11/838,556

(22) Filed: Aug. 14, 2007

(65) Prior Publication Data

US 2008/0054639 A1 Mar. 6, 2008

(30) Foreign Application Priority Data

Aug. 16, 2006 (DE) ...................... 10 2006 038 275

(51) Int. Cl.
*B60L 11/02* (2006.01)
*B61C 9/38* (2006.01)

(52) U.S. Cl. .......................................... 290/10; 290/11

(58) Field of Classification Search ................... 290/10, 290/11, 1 A, 51, 52, 36 R; 310/263, 257; 123/406.57, 406.58
See application file for complete search history.

(56) References Cited

U.S. PATENT DOCUMENTS

| | | | | |
|---|---|---|---|---|
| 2,715,685 | A * | 8/1955 | Brown | 290/1 A |
| 3,426,213 | A * | 2/1969 | Burkett et al. | 290/31 |
| 3,497,706 | A * | 2/1970 | Burkett et al. | 290/31 |
| 4,253,031 | A * | 2/1981 | Frister | 290/52 |
| 4,686,400 | A * | 8/1987 | Fujisaki et al. | 310/67 R |
| 4,859,886 | A * | 8/1989 | Tanaka et al. | 310/51 |
| 4,958,095 | A * | 9/1990 | Uchida et al. | 310/59 |
| 5,099,181 | A * | 3/1992 | Canon | 318/400.08 |
| 6,448,675 | B1 * | 9/2002 | Horng et al. | 310/67 R |
| 6,579,137 | B2 * | 6/2003 | Mabru | 440/113 |
| 6,636,007 | B2 * | 10/2003 | Hong et al. | 318/114 |
| 7,239,032 | B1 * | 7/2007 | Wilson et al. | 290/36 R |
| 2007/0034190 | A1 * | 2/2007 | Schieber et al. | 123/406.57 |
| 2007/0163557 | A1 * | 7/2007 | Layher et al. | 123/73 PP |
| 2008/0041146 | A1 * | 2/2008 | Leufen | 73/116 |
| 2009/0091137 | A1 * | 4/2009 | Nishida et al. | 290/1 R |

* cited by examiner

*Primary Examiner*—Julio Gonzalez
(74) *Attorney, Agent, or Firm*—Gudrun E. Huckett

(57) ABSTRACT

An internal combustion engine has a combustion chamber having a spark plug arranged thereat. A crankcase supports a crankshaft. An intake for introducing fuel and combustion air into the combustion chamber is provided. An exhaust for exhausting combustion gases from the combustion chamber is provided. A piston is connected to the crankshaft and drives the crankshaft in rotation. A wheel member is connected to the crankshaft and rotates with the crankshaft. An alternator driven by the crankshaft supplies electric power to a consumer. The alternator is arranged within a radial boundary of the wheel member and external to the crankcase. The alternator has a stator and a rotor, wherein the crankshaft penetrates the stator and wherein the rotor is fixedly connected to the wheel member.

37 Claims, 16 Drawing Sheets

FIG. 16
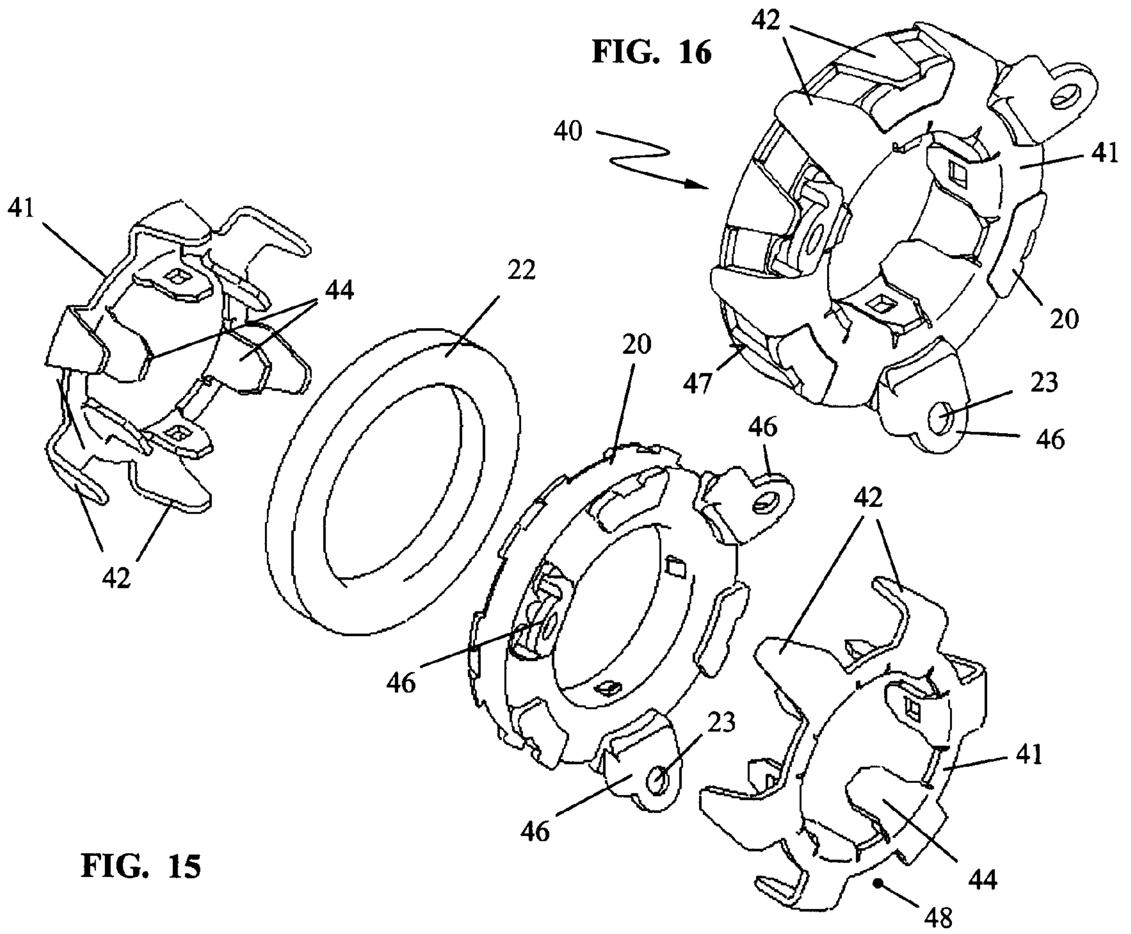
FIG. 15
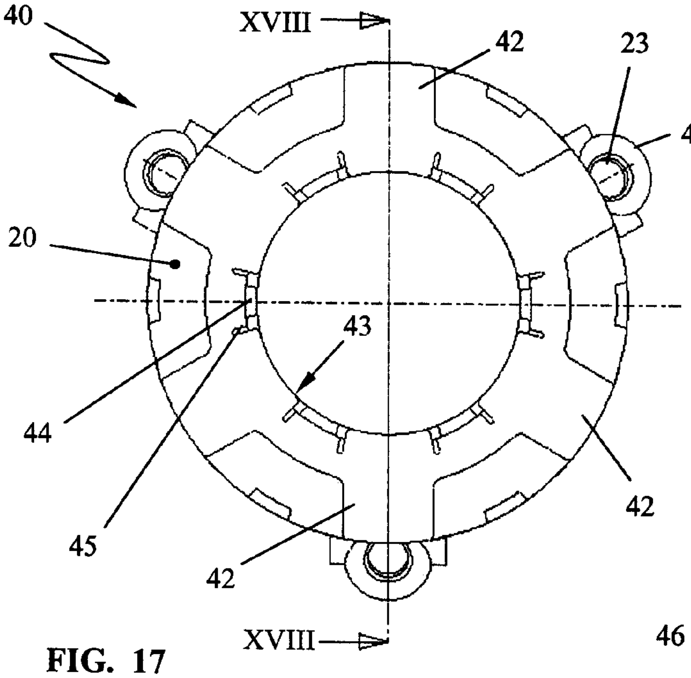
FIG. 17
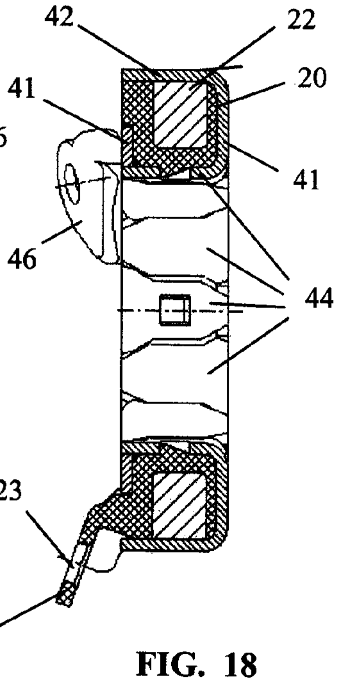
FIG. 18

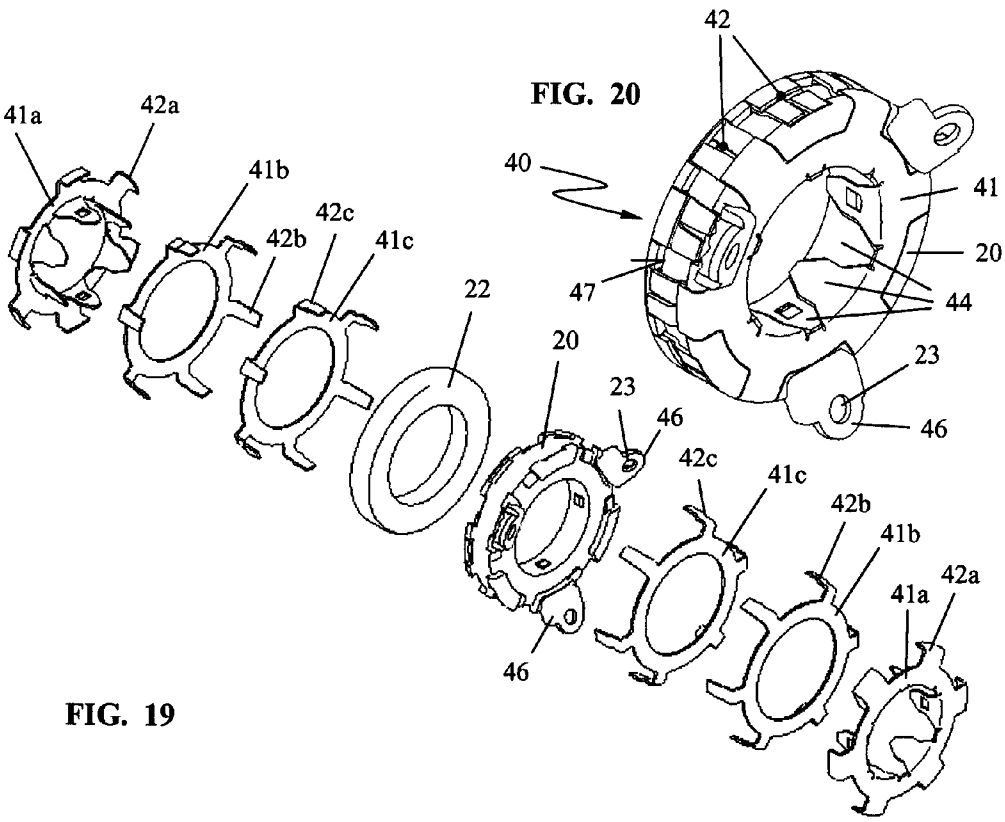
FIG. 20
FIG. 19
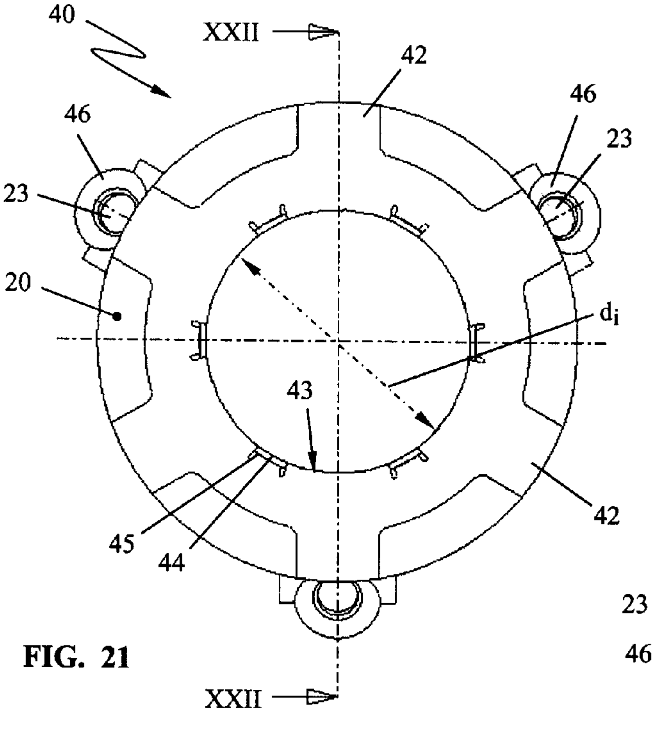
FIG. 21
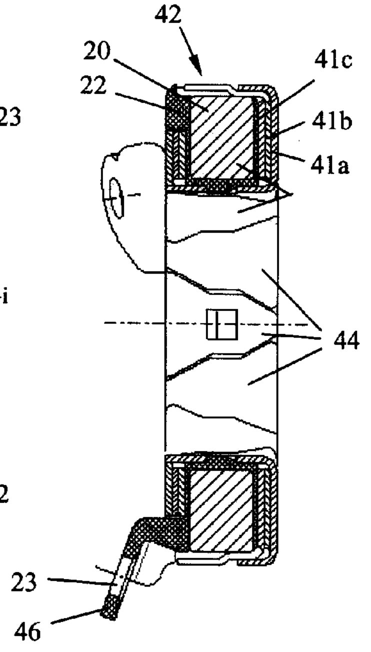
FIG. 22

FIG. 24
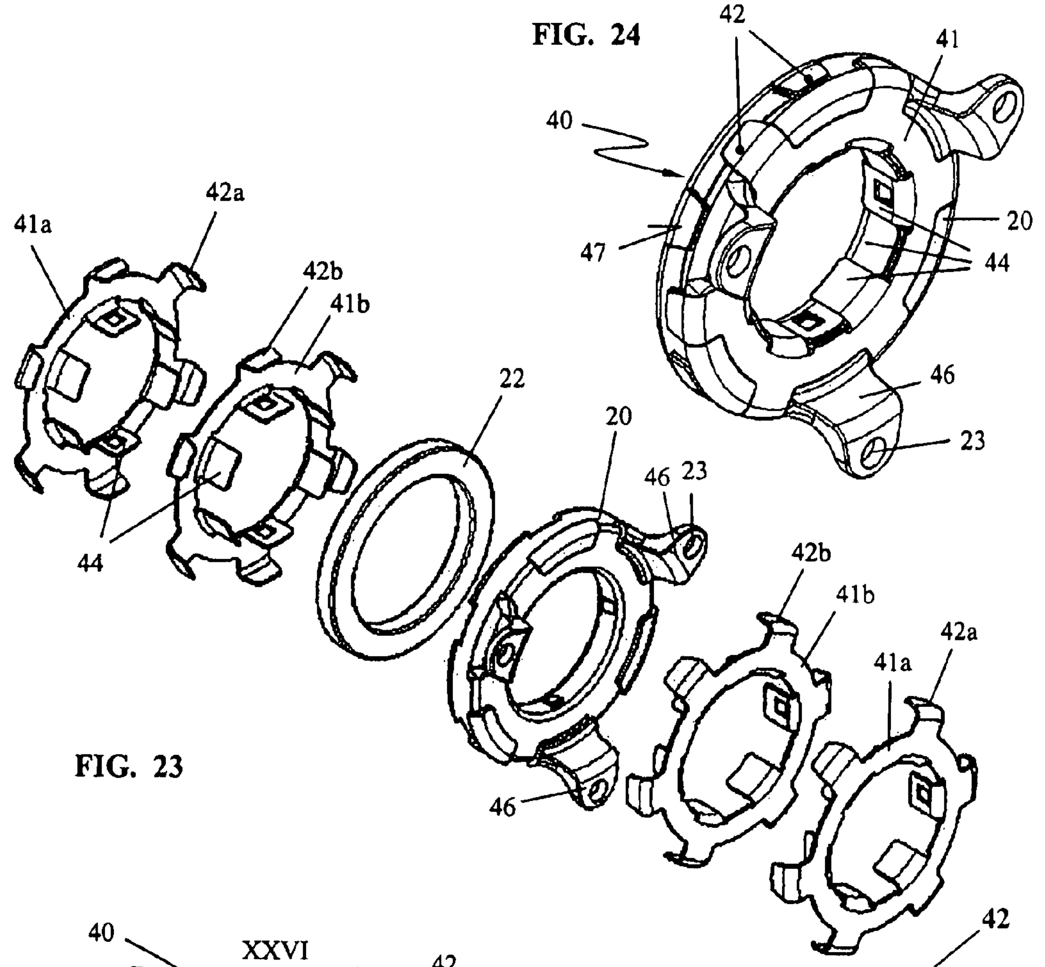
FIG. 23
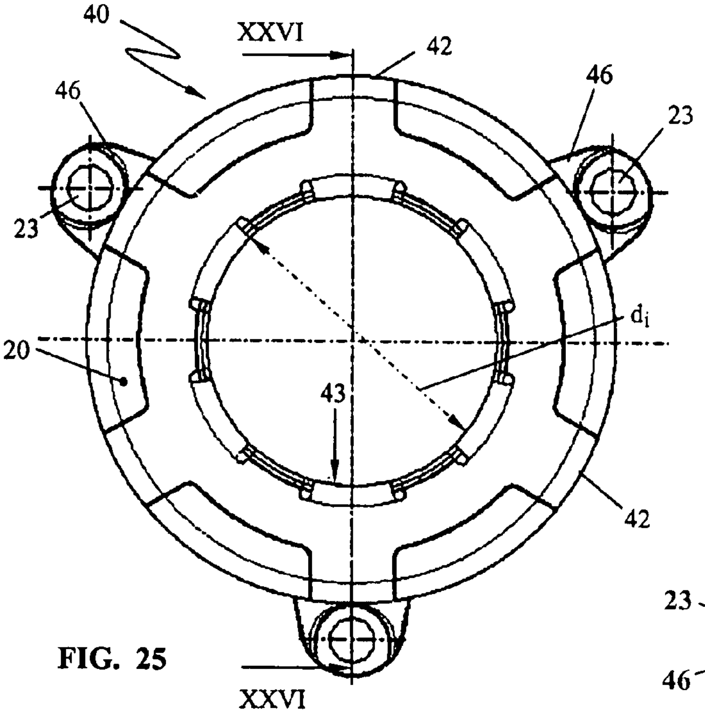
FIG. 25
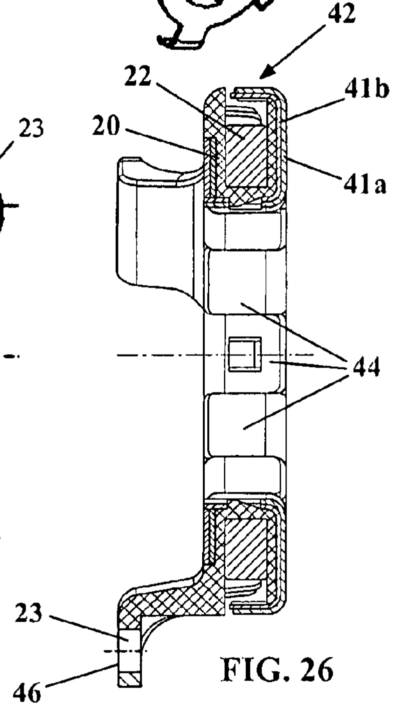
FIG. 26

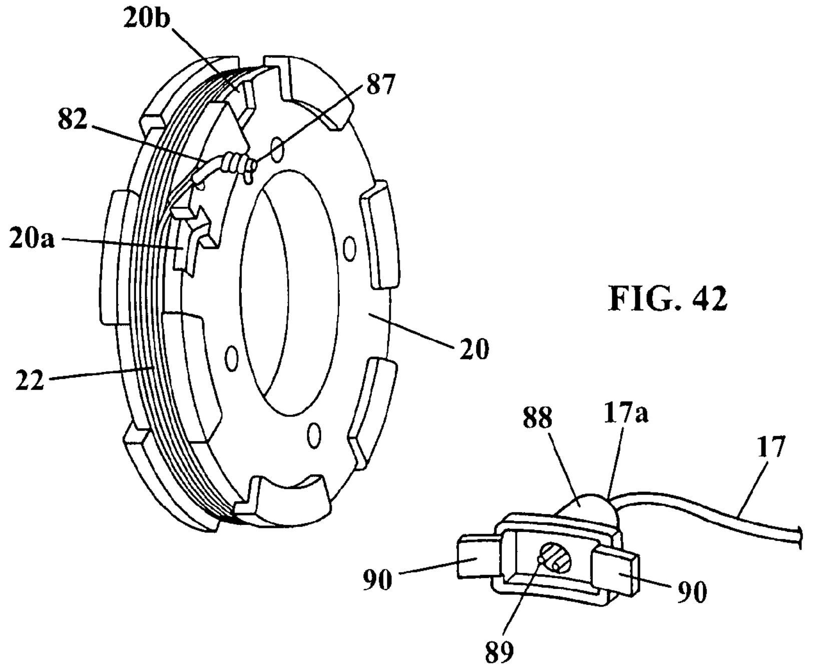
FIG. 42
FIG. 43
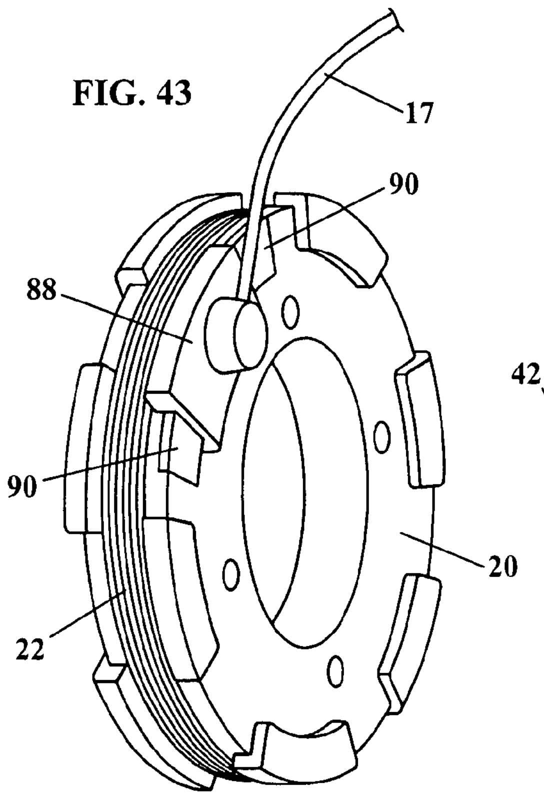
FIG. 44
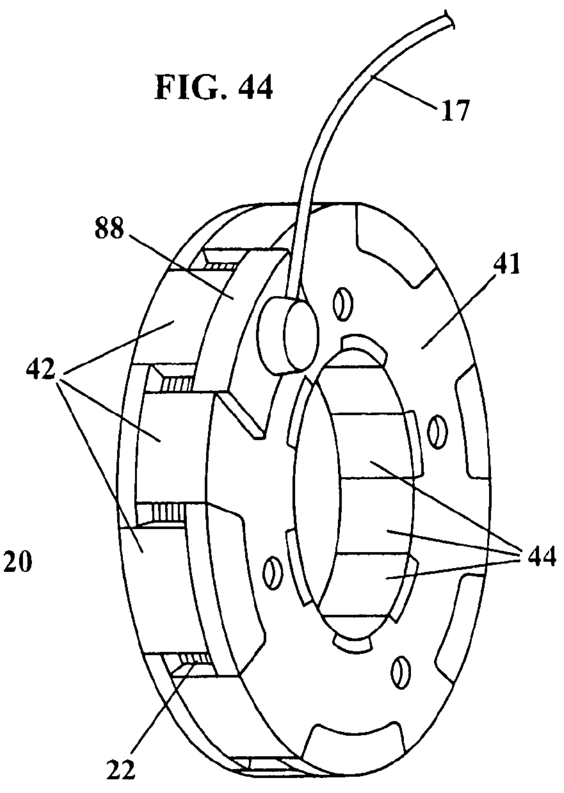

INTERNAL COMBUSTION ENGINE WITH ALTERNATOR

BACKGROUND OF THE INVENTION

The invention relates to an internal combustion engine in a hand-held power tool such as a motor chain saw, a cut-off machine, a trimmer, a blower or a similar device, wherein the internal combustion engine comprises a piston, a combustion chamber with a spark plug, and a crankshaft driven in rotation by the piston and supported in a crankcase. An intake for combustion air and fuel and an exhaust for combustion gases are provided. A wheel member is mounted on the crankshaft and rotates with the crankshaft. An alternator is driven by the crankshaft and supplies an electric consumer.

In the case of such internal combustion engines, it is known to use the alternator as an energy source for operating the ignition as well as for operating electric consumers, for example, a carburetor heater, a handle heater for a motor chain saw or the like.

In the housings of portable hand-held power tools, there is only little space available for arranging such an alternator. In order to deliver sufficient power, the alternator must be of an appropriate size and configured to be powerful. In this connection, it must be taken into consideration that an alternator in portable hand-held power tools is subjected to significant mechanical loads, for example, caused by vibrations. Also, the thermal behavior of the alternator must be designed to avoid damage at the alternator itself and/or at the components surrounding it.

SUMMARY OF THE INVENTION

It is an object of the present invention to provide an internal combustion engine with an alternator that requires little space, delivers sufficient electric power, and is resistant to mechanical and thermal loads over a long operating time.

In accordance with the present invention, this is achieved in that the alternator is arranged within the radial boundary of the wheel member and external to the crankcase. In this way, the alternator can partially penetrate into the crankcase and/or into the wheel member or can be integrated therein. The stator, provided in particular with a stationary induction coil, is penetrated by the crankshaft while the rotor is fixedly connected to the wheel member. The arrangement of the alternator in the area between the crank case and the wheel member provides a mechanical protection against damage and soiling. When the crankcase is appropriately designed and the wheel member rotating with the crankshaft is appropriately modified, in the space that is thus provided the alternator can be arranged without increasing the size in the crankshaft direction significantly.

The wheel member rotating with the crankshaft can be, for example, a part of a clutch that is connected fixedly to the crankshaft and is used for driving the tool by means of the internal combustion engine. Advantageously, the wheel member is provided by the fan wheel that conveys cooling air to the internal combustion engine. This fan wheel supports the rotor on its side facing the crankcase wherein the rotor expediently is integrated into the fan wheel member. The integration can be realized to such an extent that the rotor essentially is located within the outer contour of the wheel member, i.e., the fan wheel member completely covers the rotor.

The magnets of the annular magnet arrangement (magnet ring) are positioned expediently in recesses of the wheel member itself and are advantageously secured against failing out of the recesses by gluing or clamping. In order to improve magnetic flux, the annular magnet arrangement of the rotor can have an external magnet yoke. Also, the arrangement of an individual magnet instead of an annular magnet arrangement is expedient.

The stator is essentially formed by the coil support that is enclosed by a stator yoke having poles that are positioned at the outer periphery of the coil support. In this connection, the stator yoke is comprised of at least two sheet metal pieces of minimal thickness wherein a first sheet metal piece is arranged on a first end face of the coil support and the second sheet metal piece on the opposite end face of the coil support. The spaced-apart poles of the stator sheet metal pieces mesh like combs with one another by engaging the pole gaps, respectively, and are positioned at the outer periphery of the coil support. At the inner circumference of the coil support, the sheet metal pieces engage one another so as to conduct magnetic flux. Preferably, the stator sheet metal pieces are connected at the inner circumference of the coil support positive-lockingly or frictionally with one another and/or with the coil support for example, by a snap-on connection. In order to prevent undesirable leakage flux between the claws, the spacing between neighboring claws is greater than 2 mm, preferably greater than 3 mm. In order to provide, on the one hand, at a minimal engine speed of approximately 300/min a satisfactory high power output and, on the other hand, to prevent at high engine speed of approximately 15,000/min too much heat development, the stator sheet metal is selected to have a thickness of approximately 1 mm. The stator sheet metal is advantageously manufactured from electric sheet. Electric sheet has the positive property that, as a result of its high electric resistance, detrimental eddy currents are reduced and magnetic flux is still conducted well. In this way, a small-size claw pole alternator with stationary coil is provided that has high engine speed dynamics from 300/min to 15,000/min without becoming hot. The claw pole alternator provides power of 2 to 20 watts at low engine speed and power between 40 and approximately 200 watts at high engine speed.

In order to provide a sufficient electric power, the spacing between two neighboring poles is designed to correspond to the n-th portion of a crankshaft revolution wherein n is an integer in the range from 6 to 24. An advantageous configuration results when the stator is provided with 12 poles that are uniformly distributed about the circumference of the coil support distributed, wherein six poles are correlated with the stator sheet metal piece at the first end face and six poles are correlated with the stator sheet metal piece at the opposite, second end face. Such alternators have a power between 2 and 200 watts.

In a preferred embodiment of the invention, the alternator is not only provided as an energy source but at the same time as an ignition angle transducer. In this connection, the signals of the alternator are electronically evaluated because the alternating voltage signal contains characteristic features that allow to deduce information in regard to the angle position of the crankshaft. When a characteristic feature is recognized, the actual angle position of the crankshaft can be correlated with the corresponding crank angle of the characteristic feature so that ignition can be carried out in accordance with the crank angle without this requiring an angle sensor.

In an advantageous embodiment of the invention, the alternator that is embodied preferably as a claw pole alternator, a radial alternator or the like, is connected as a starter motor in order to start the internal combustion engine or to at least assist in the starting process. Expediently, the alternator in a first operating mode is connected as an energy source and/or a signal transducer, for example, ignition angle transducer, and in a second operating mode as a starter motor. In this connection, the system in the second operating mode can be supplied by an energy source, for example, an internal or external starter battery. The starter battery can be recharged by the alternator in the first operating mode of the alternator.

In the context of the present application, the term "alternator" is to be understood generally such that the alternator can also be utilized as a starter motor when appropriately connected. An alternator that can be used at the same time as a starter motor can be generally referred to as an alternating current (AC) machine.

BRIEF DESCRIPTION OF THE DRAWING

FIG. 15 is an exploded view of a further embodiment of a stator of an alternator which stator has fastening tabs.

FIG. 16 is a view of the stator according to FIG. 15 in the assembled state.

FIG. 17 is an end view of the stator according to FIG. 16.

FIG. 18 is a section along section line XVIII-XVIII of FIG. 17.

FIG. 19 is an exploded view of a further embodiment of the stator with laminated yoke.

FIG. 20 is a view of the stator according to FIG. 19 in the assembled state.

FIG. 21 is an end view of the stator according to FIG. 20.

FIG. 22 is a section along the section line XXII-XXII of FIG. 21.

FIG. 23 is an exploded view of a further embodiment of the stator with laminated yoke.

FIG. 24 is a view of the stator according to FIG. 23 in the assembled state.

FIG. 25 is an end view of the stator according to FIG. 24.

FIG. 26 is a section along the section line XXVI-XXVI of FIG. 25.

FIG. 42 is a perspective illustration showing a coil support with wound coil and a coil end that is wound by a wire-wrap technology onto a pin and also showing a signal line with plug.

FIG. 43 is a coil support according to FIG. 42 with the plug placed onto the pin.

FIG. 44 shows the coil support according to FIG. 43 with stator sheet metal pieces securing the plug.

DESCRIPTION OF THE PREFERRED EMBODIMENTS

Figure 1:
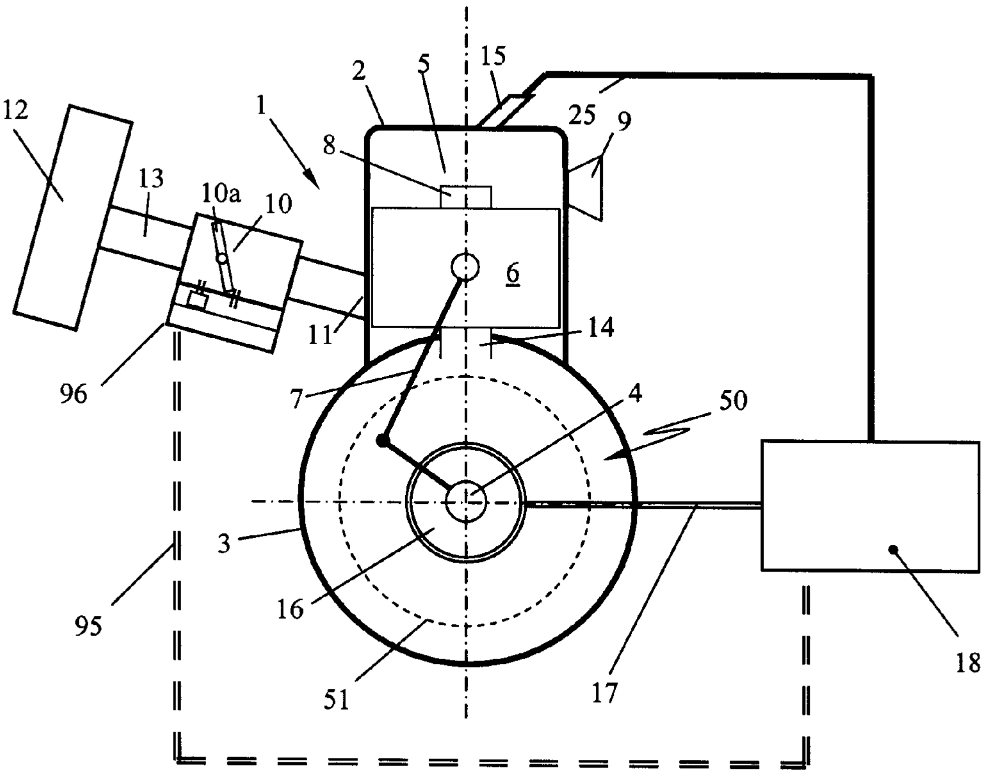
FIG. 1 is a schematic illustration of an internal combustion engine with alternator.

The schematic illustration of FIG. 1 shows an internal combustion engine 1 embodied as a two-stroke engine. The invention is however not limited to the use in single-cylinder or multi-cylinder two-stroke engines. The invention is also suitable for use in single-cylinder or multi-cylinder four-stroke engines or other engines, for example, rotary piston engines. In modern power tools such as motor chain saws, cut-off machines, trimmers, blowers or similar devices, such engines, in particular reciprocating piston engines, are used as drives.

The internal combustion engine 1 comprises a cylinder 2 with a crankcase 3, in which a crankshaft 4 is rotatably supported. A combustion chamber 5 is provided in the cylinder 2 and is delimited by a reciprocating piston 6. The piston 6 is connected by connecting rod 7 to crankshaft 4 in the crankcase 3 and drives the crankshaft 4 in rotation. In the illustrated embodiment an intake port 8 for combustion air and/or a mixture opens into the combustion chamber 5; the intake port 8 is located at the end of a transfer passage 14 provided in the cylinder wall. The other end of the transfer passage 14 is open toward the crankcase 3. Moreover, an exhaust 9 is provided at the combustion chamber 5 through which the combustion gases are exhausted from the combustion chamber 5.

A fuel/air mixture is supplied to the internal combustion engine 1 through carburetor 10 wherein the mixture intake 11 opens into the crankcase 3. The combustion air is taken in through air filter 12 and conveyed through intake passage 13 and carburetor 10 to the mixture intake 11. As the piston 6 moves upwardly, the under pressure created in the crankcase 3 sucks in the mixture via mixture intake 11 into the crankcase 3. As the piston 6 moves downwardly, the mixture that has been conveyed into the crankcase 3 passes through transfer passage 14 to the intake port 8 and flows into the combustion chamber 5. Upon further upward movement of the piston 6, the intake port 8 and the exhaust 9 are closed so that the mixture in the combustion chamber 5 will be compressed. The compressed mixture is ignited by a spark plug 15 and the expanding combustion gases drive the piston 6 downwardly; the exhaust 9 is opened and the combuston gases can be exhausted. The amount of incoming combustion air is controlled by a pivotable throttle valve 10*a* in the carburetor 10.

In the illustrated embodiment, a fan wheel 51 for a cooling air supply and an alternator 16 are driven by the crankshaft 4; the induced voltage signals of the alternator 16 are supplied by line 17 to ignition unit 18. The ignition unit 18 is connected by high-voltage cable 25 to the spark plug 15. The high-voltage cable 25 and the electrical line 17 are sufficient as a connection between internal combustion engine 1 and ignition unit 18 for proper function.

Figure 2:
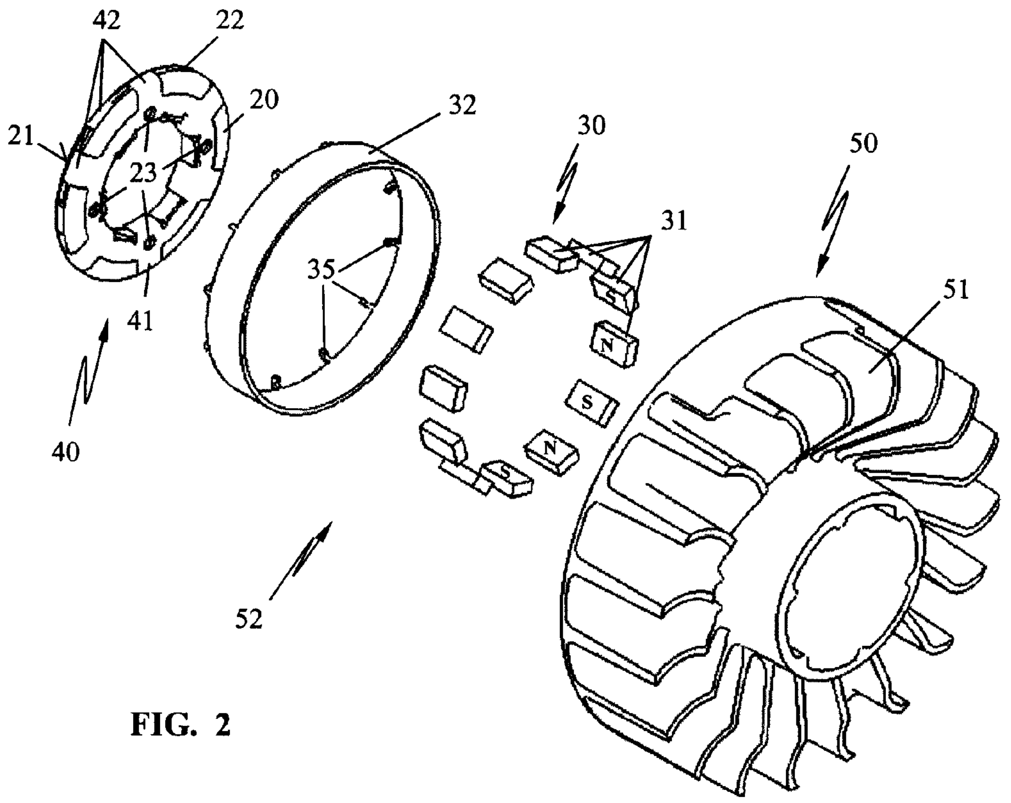
FIG. 2 is an exploded view of a configuration of an alternator arranged on an internal combustion engine according to FIG. 1.

The alternator 16 provided on the internal combustion engine 1 is advantageously embodied in a first embodiment as a so-called claw pole alternator as illustrated schematically in the exploded view of FIG. 2. In general, such a device is referred to as alternating current machine which, in one operating mode, can function as an alternator and is constructed e.g. as a claw pole alternator. The alternator 16 can be used for supplying electrical consumers, for example, a carburetor heater 96 connected to ignition unit 18 by cable 95. The energy of the alternating voltage signal can also be used for supplying other internal or external consumers, for example, it is possible to recharge a rechargeable battery that supplies, for example, the ignition or an electric starter or solenoid starter. The alternating voltage signal can be processed in the ignition unit 18 as needed.

In an advantageous configuration, the alternator 16 is designed or connected such that in an alternate operating mode it operates as a starter motor. The alternator 16 working as a starter motor can serve as the only means for starting the internal combustion engine 1 or assist in starting the engine, for example, together with a cable pull starter. Preferably, the alternator 16 is designed such that in one operating mode it operates as a starter motor for starting the internal combustion engine 1 without external assistance. In the other operating mode that is switched by a switching unit 77, the alternator 16 is utilized as an energy source and/or signal source in order to supply the ignition unit 18 by line 17 with energy and to generate an ignition angle signal. The alternator 16 is thus at the same time an energy source, an ignition angle transducer, signal transducer, sensor and starter motor, depending on which operating mode is switched at the switching unit 77. When being used as a starter motor, the alternator 16 is supplied with energy from an energy source 78 that can be a rechargeable starter battery and can provide also the required energy for the ignition during engine start. The energy source 78 can be connected by switching unit 77 and line 76 to the alternator 16.

It can be advantageous to arrange the ignition unit 18 separate from the alternator 16 at a thermally advantageous location. For example, as a result of its configuration, it is possible to arrange the ignition unit 18 on the bottom side of the crankcase 3 so that it is remote from the cylinder 2. An arrangement in the space of the claw pole alternator 16 between crankcase 3 and the wheel member 50 is also expedient. In order to keep the length of the high-voltage cable extending to the spark plug 15 minimal, a high-voltage unit can be arranged separate from the ignition unit 18 near the spark plug or can even be integrated into the spark plug.

The alternator 16 is comprised essentially of a coil support 20 that is fixedly mounted and is particularly secured by fastening screws on the crankcase 3 of the internal combustion engine. The fastening screws penetrate fastening openings 23 in the stator 40 wherein the coil support 20 on its end faces supports a sheet metal piece 41, respectively, whose poles 40 cover the outer circumference 21 of the coil support 20. The configuration is advantageously that of a claw pole alternator. The coil 22 arranged in the coil support is covered in the embodiment according to FIG. 2 by a total of twelve claws 42. The claws 42 alternatingly cover the coil 22 from one or the other end face the coil 22. The claws 42 are poles for a magnet ring for the alternating magnetic flux. Between the claws 42 and the coil 22 an O-ring 29 is advantageously provided that closes off a circumferential groove.

Figure 9:
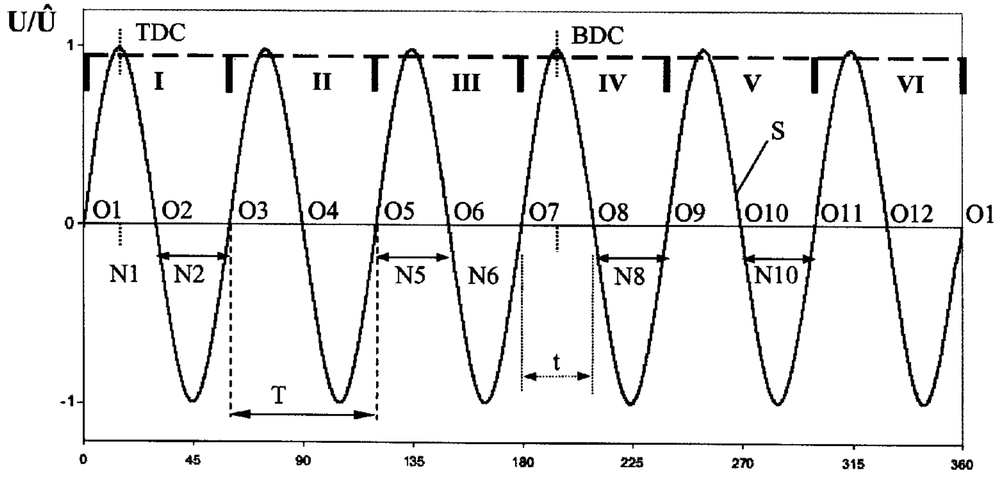
FIG. 9 is an idealized illustration of the voltage course of the alternator.

The division of the periphery into a number of poles/claws 42, wherein the number is an integer, is done for the purpose of inducing an alternating voltage signal that can provide information. Accordingly, for one crankshaft revolution an alternating voltage signal with several periods is to be generated. Advantageously, one crankshaft revolution is divided into n periods T wherein n is to be greater than two and is maximally 12. Advantageously, n is an integer in the range from 4 to 6, in particular from 5 to 7. In the illustrated embodiment, n is selected to be six, so that a continuous alternating voltage signal with six full waves or twelve half waves is generated, as shown in FIG. 9. The constructive correlation of the stator 40 and the rotor 52 can be advantageously chosen such that the top dead center TDC of the piston is near, preferably at, the maximum of a half wave. The angle position is expediently such that a zero crossing $O_i$ is preferably at approximately 15° CA before top dead center TDC. Correspondingly, bottom dead center of the piston is approximately at 195° CA.

Figure 3:
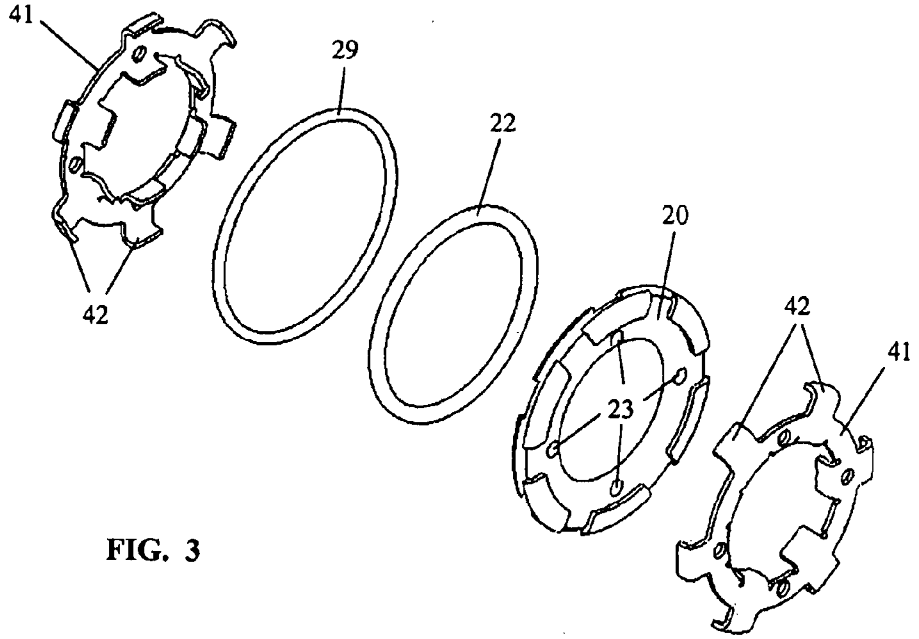
FIG. 3 is an exploded view of a stator of the alternator according to FIG. 2.
Figure 4:
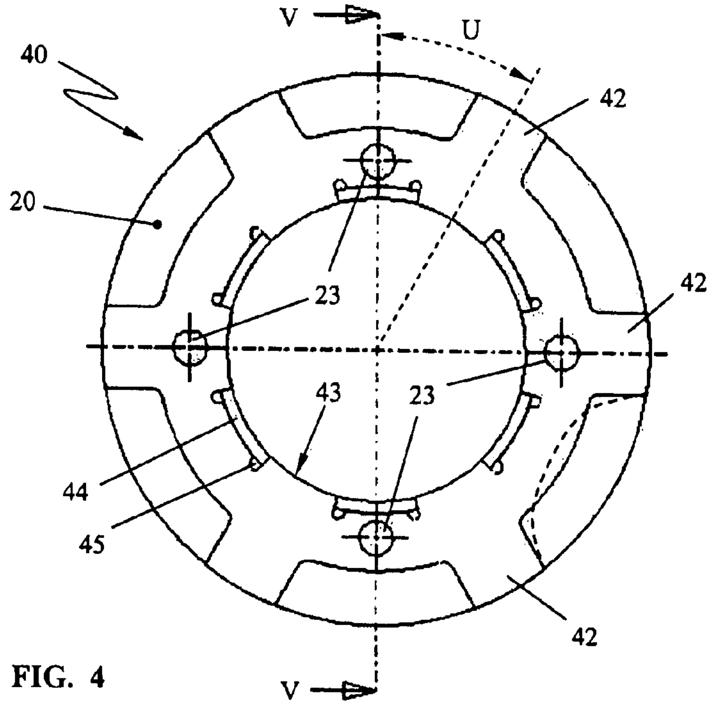
FIG. 4 is an end view of the stator according to FIG. 3
Figure 5:
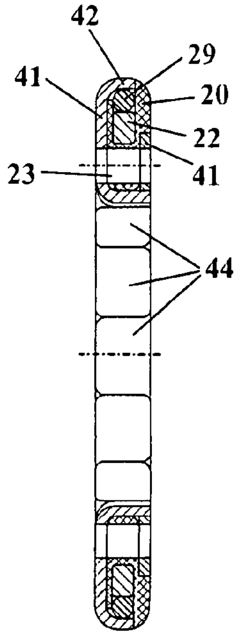
FIG. 5 is a section along the section line V-V of FIG. 4.

The precise configuration of the stator can be taken from FIGS. 3 through 5. The coil support 20 is a shaped body that is preferably made from plastic material and has an outer circumferential groove for receiving the coil 22 or several coils. The coil 22 that in the illustrated embodiment is wound into the circumferential groove is covered by several claws 42 forming magnetic poles, wherein the claws 42 in the circumferential direction are mechanically separated from one another. Preferably, the spacing between neighboring claws 42 is more than 2 mm, in particular, more than 3 mm. At each end face of the coil support 20 a stator sheet metal piece 41 is provided wherein each stator sheet metal piece 41 in the illustrated embodiment covers the coil 22 with six claws 42. The circumferential spacing U between two neighboring claws is, as shown in FIG. 4, 30° CA (crank angle) so that about the circumference of the stator 40 there are twelve claws 42 provided as magnetic poles. Six poles each project from one stator sheet metal piece across the coil 22 so that in the circumferential direction the poles of the first and second stator sheet metals pieces provided at the first and second end faces alternate. The stator sheet metal pieces 41 are comprised of a thin sheet metal that is suitable for magnetic applications, in particular of a sheet metal of approximately 1 mm thickness. Especially suitable are electric sheets. For attaching the assembled stator according to FIG. 4, the coil support 20 and the respective stator sheet metal pieces 41 are provided with through holes 23 that, in the illustrated embodiment (FIGS. 2, 3, 4, 5), are positioned at the radial inner circumference 43 of the coil support 20. The fastening holes 23 penetrate the coil support 20 at a location radially inside the coil 22 so that a rotor 52 projecting past the stator 40 is not impaired by the fastening means. It can also be expedient to arrange the fastening holes 23 at the radial outer circumference so that the coil 22 is positioned inside the arrangement of the fastening holes 23.

The two sheet metal pieces 41 forming the stator yoke engage one another at the inner circumference of the coil support 20 so as to conduct flux. Preferably, the stator sheet metal pieces 41 are connected at the inner circumference 43 of the coil support 20 with one another and/or with the coil support 20 in a positive-looking or frictional way, in particular, by a snap-on connection. Radial inner tabs 44 of one sheet metal piece 41 engage corresponding recesses 45 of the other sheet metal piece 41. The fastening screws 25 provided for mounting the stator 40 on the crank case and guided through fastening holes 23 secure the stator 40 additionally in its position so that even under mechanical or electric load an axial separation is prevented.

For reducing the leakage flux the area of the stator sheet metal pieces 41 between two claws 42 can be shaped in an appropriate way, for example, can be rounded, as illustrated in FIG. 4 in dashed lines.

As shown in FIG. 2, the fixedly secured stator 40 has correlated therewith an annular magnet arrangement 30 (magnet ring) comprised of individual permanent magnets 31 wherein the permanent magnets 31 are distributed with alternating polarity about the circumference. In the illustrated embodiment, in accordance with the number of claws 42 (poles) on the stator 40, there are twelve permanent magnets 31. The permanent magnets 31 are positioned in the circumferential direction at an angle spacing of 30° CA.

The permanent magnets 31 in one embodiment are arranged on a wheel member 50 that is provided by the fan wheel 51 that is fixedly mounted on the crankshaft 4. The wheel member 50 is illustrated schematically in FIG. 1 as a circle in dashed lines.

The magnets 31 that are secured preferably in receiving recesses 53 (FIG. 12) in the wheel member 50 of the fan wheel 51 are surrounded by a magnetic yoke 32 for increasing their magnetic effect.

Figure 6:
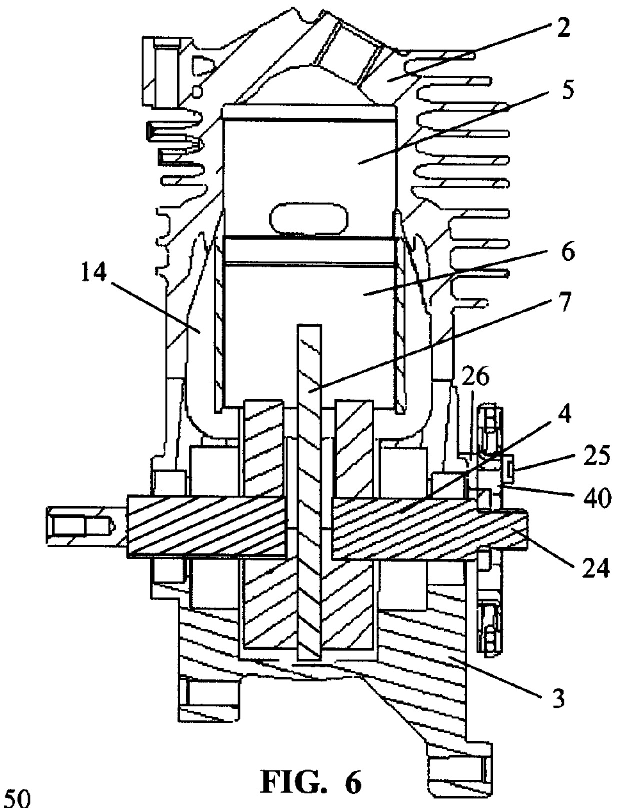
FIG. 6 is a section of the internal combustion engine according to FIG. 1 showing the stator connected to the crankcase.
Figure 8:
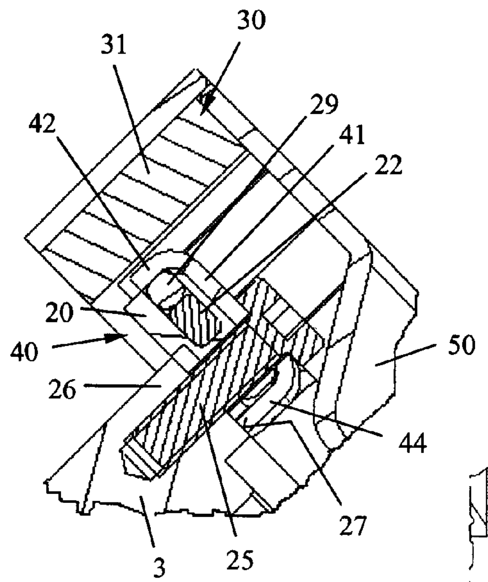
FIG. 8 is a detail view of the attachment of the stator on the crankcase of the internal combustion engine.
Figure 7:
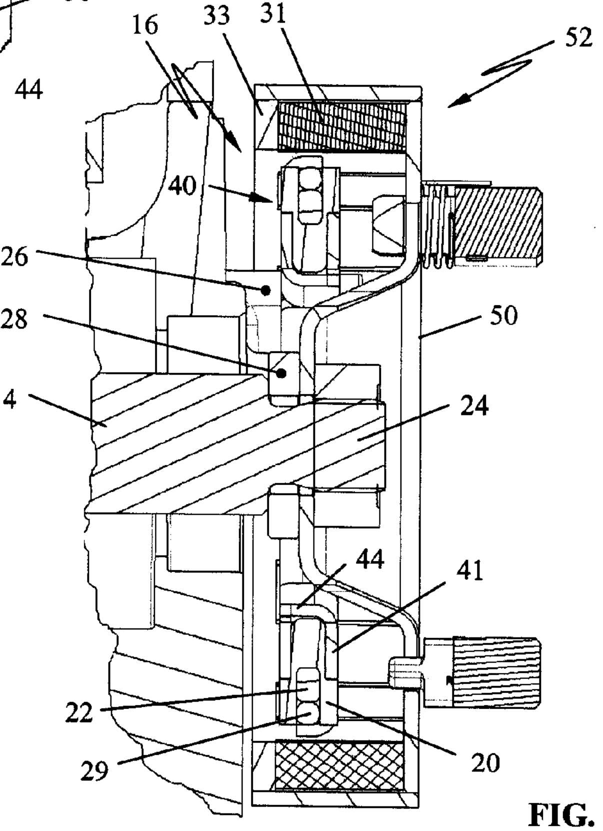
FIG. 7 is a detail section illustration of the alternator arranged on the internal combustion engine.

As illustrated in FIGS. 6 through 8, the alternator 16 that is embodied in the illustrated embodiment preferably as a claw pole alternator is arranged in the area of a crankshaft end 24 of the crankshaft 4 between the crankcase 3 and the wheel member 50. The rotor 52 is part of a clutch by which a tool of the power tool is driven by means of the crankshaft. Such a power tool is a cut-off machine, for example. The stator 40 of the alternator 16 is penetrated by the crankshaft end 24 of the crankshaft 4 wherein the rotor 52 of the clutch is attached to the crankshaft end 24. In the illustrated embodiment according to FIGS. 6 through 8, the stator 40 is secured by means of fastening screws 25 on the crankcase 3 for which purpose a fastening projection 26 is formed expediently on the crankcase 3; a sheet metal piece 41 of the stator yoke rests on the end face 27 of the projection 26. In this way, not only an excellent mechanical securing action is provided but at the same time an electric ground connection is provided. The coil 22 is advantageously connected with one end electrically to the stator sheet metal piece 41 so that an electric ground connection of the coil is realized.

In the embodiment according to FIG. 6 through 8, the arrangement of the stator 40 and the rotor 52 is such that the stator 40 is completely within the outer contour of the wheel member 50. In this connection, the axial position of the wheel member 50 can be adjusted on the end 24 of the crankshaft 4 by washers 28 selected to have an appropriate thickness.

The position of the stator 40 between the wheel member 50 and the crankcase 3 protects the alternator 16 from soiling and mechanical action. The surface contact at the end faces 27 of the fastening projection 26 not only provides an excellent ground connection but also ensures an excellent heat transfer onto the crankcase 3 so that overheating of the induction coil 22 or the induction coils is counteracted.

Upon rotation of the crankshaft, the magnet ring 30 of the rotor 52 rotates relative to the claws 42 (poles) of the stator 40 so that the alternator 16 generates a sine-shaped alternating signal in accordance with the idealized standardized illustration of FIG. 9. The correlation of rotor 52 and stator 40 of the alternator 16 is chosen such that a zero crossing $O_i$ is located shortly before top dead center TDC of the piston. In FIG. 9, top dead center TDC of the piston is approximately 15° CA after a zero crossing $O_i$; correspondingly, bottom dead center BDC of the piston is approximately at 195° CA.

The number of poles 42 or claws of the stator 40 is selected such that the spacing between two neighboring poles corresponds to the n-th portion of a crankshaft revolution. Advantageously, n is an integer in the range from 6 to 24. In the illustrated embodiment, n is selected to be twelve so that twelve claws (poles) 42 are uniformly distributed about the circumference of the coil support 20.

As a result of the twelve claws (poles) 42 and the twelve permanent magnets 31 of the magnet ring 30 that are correlated with the poles and are positioned in alternating polarity about the circumference adjacent to one another, the signal as illustrated in FIG. 9 results upon rotation of the rotor 52. The spacing between two zero crossings $O_i$ and $O_{i+1}$ corresponds precisely to 30° CA in accordance with the constructive configuration of the stator 40 and the rotor 52. For one crankshaft revolution of 360° CA, twelve zero crossings O1 to O12 of the signal S are thus obtained. The time t between two zero crossings $O_i$ depends on the rotary speed of the crankshaft 4 so that the time t is a measure for the rotary speed of the crankshaft 4. At each zero position interval $N_i$ it is thus possible to determine the actual rotary speed for each zero position interval N1 to N12 by determining the time t and the known constructive configuration of the stator (30° CA spacing of the poles 42). The alternating voltage signal S is comprised thus of six periods I to VI of period duration T.

When the alternator 16 according to the invention is not only used as an energy source but also as an ignition angle transducer, it can be expedient to provide the rotary position of the stator 40 on the crankcase 3 such that top dead center TDC of the piston 6 is positioned, for example, at a maximum of the half wave or approximately 15° CA after a zero crossing $O_i$ of the voltage signal S. A constructive orientation of the stator 40 in such a way that the top dead center of the piston 6 is at the center between two zero crossings $O_i$, i.e., in the area of the maximum of the half wave, can simplify the evaluation of the alternating voltage signal S as an ignition angle signal. In order to recognize a zero crossing $O_i$ of the induced alternating voltage signal S with a low error rate, it is provided that the current flow is suppressed, e.g. switched off, possibly by an electric load being provided, from approximately 5° CA before an expected zero crossing $O_i$ to approximately 1° CA after this zero crossing $O_i$ so that the zero crossing detection is carried out in a load-free state of the alternator 16.

Figure 10:
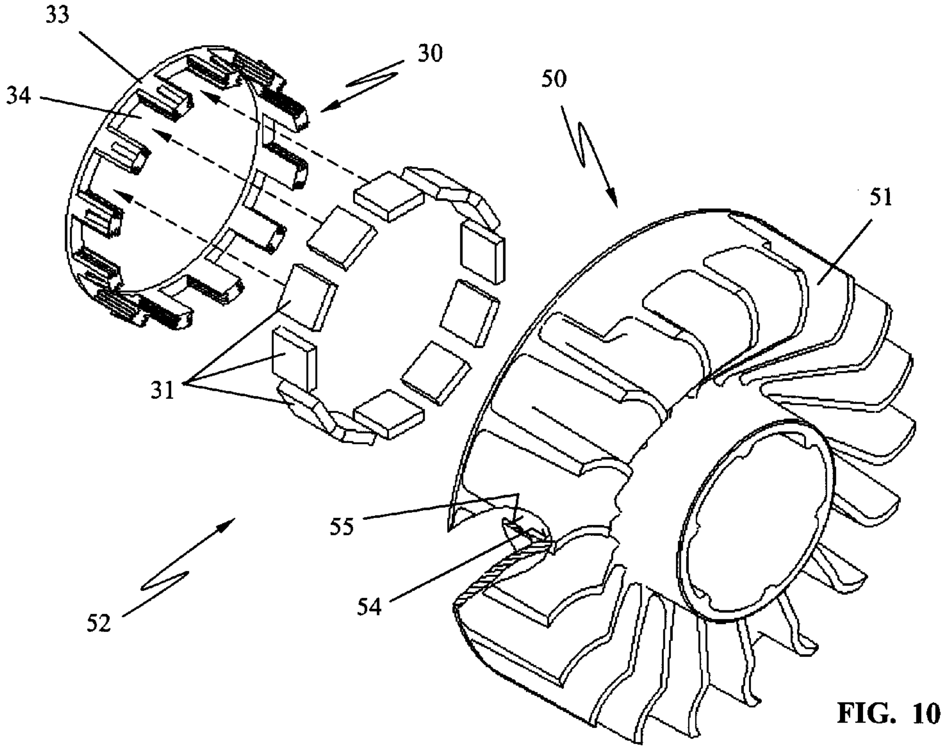
FIG. 10 is a schematic illustration of the configuration of the rotor as an integrated component of the fan wheel of the cooling fan.

In FIG. 10, a basic illustration of the integration of the magnet ring 30 of the rotor 52 into the wheel member 50 of the fan wheel 51 is illustrated. Expediently, the permanent magnets 31 that are positioned with alternating polarity adjacent to one another are inserted into a common support ring 33, preferably a plastic ring. Individual receiving recesses 34 are provided in the support ring 33 that are open toward the bottom 54 of the wheel member 50. The support ring 33 equipped with the permanent magnets 31 is axially inserted into the receiving cup 55 of the wheel member 50. Expediently, fixation of the support ring 33 in the receiving cup 55 is realized by securing tabs, by gluing or similar means.

Figure 11:
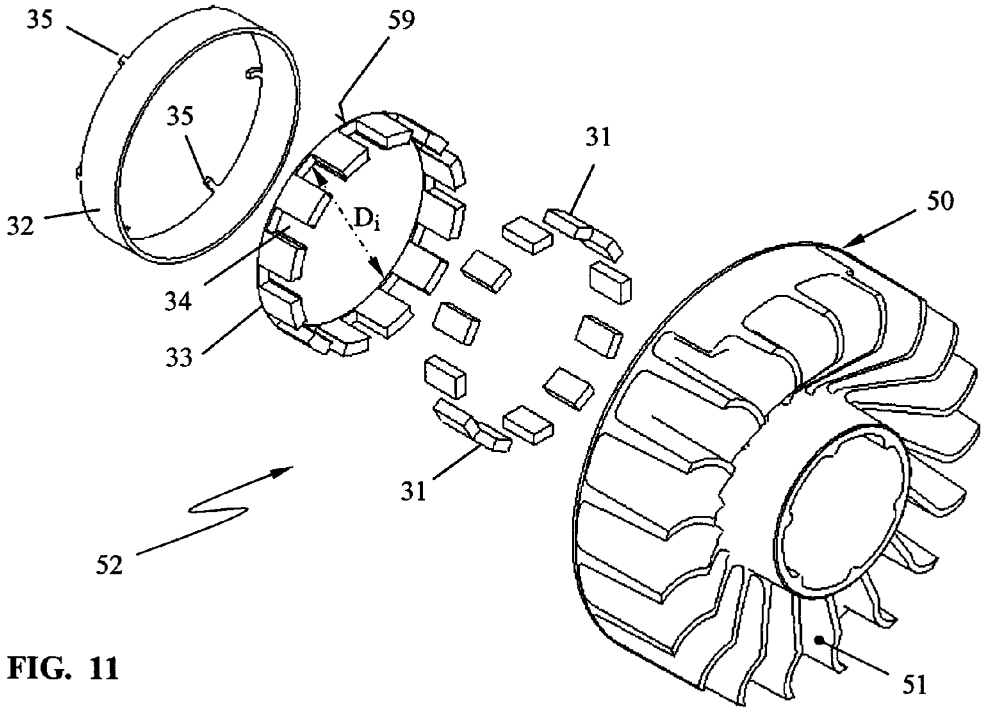
FIG. 11 is a view of a fan wheel according to FIG. 10 with integrated rotor of the alternator.

FIG. 11 shows an arrangement in accordance with FIG. 10 in the mounted state. The receiving cup 55 is a central recess in the wheel member 50 of the fan wheel 51 wherein the support ring 33 is received with a portion of its axial height in the contour of the wheel member 50. In the embodiment according to FIG. 11 an annular magnetic yoke 32 is provided for reinforcing the magnetic flux. The yoke 32 is secured in a suitable way fixedly in the receiving cup 55. The yoke 32 has clamping tabs 35 that are bent against the support ring 33 and secure the ring 33 in its position in the receiving cup 55.

Figure 12:
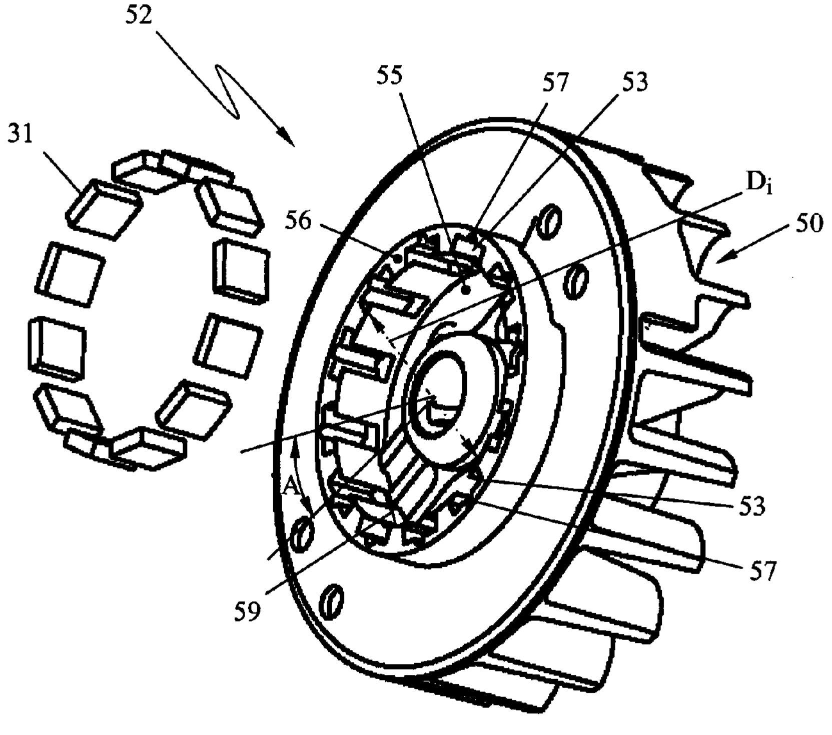
FIG. 12 is a view of a fan wheel with integrated rotor and magnets secured in receiving recesses of the fan wheel.
Figure 13:
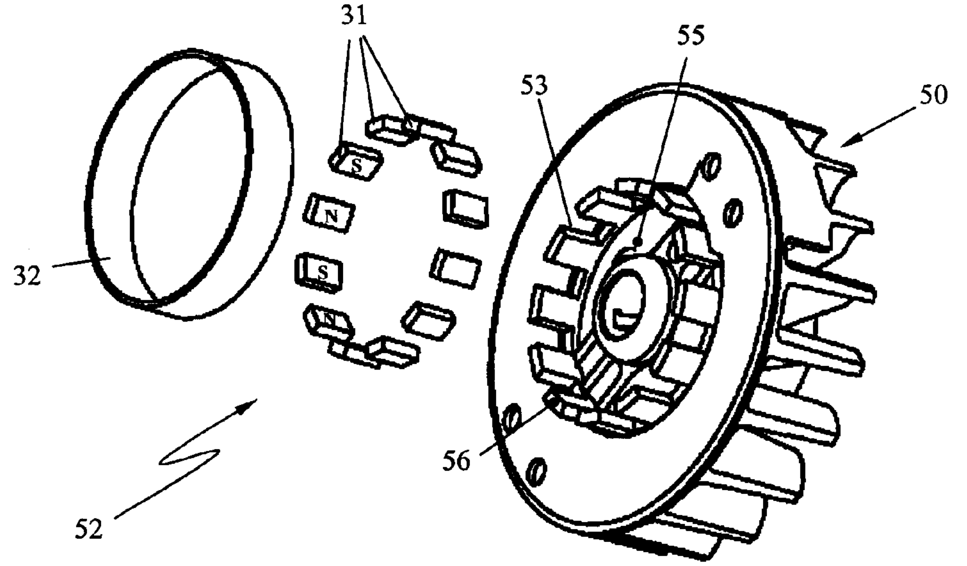
FIG. 13 is a view of the rear of a fan wheel with integrated rotor and magnet yoke arranged thereat.
Figure 14:
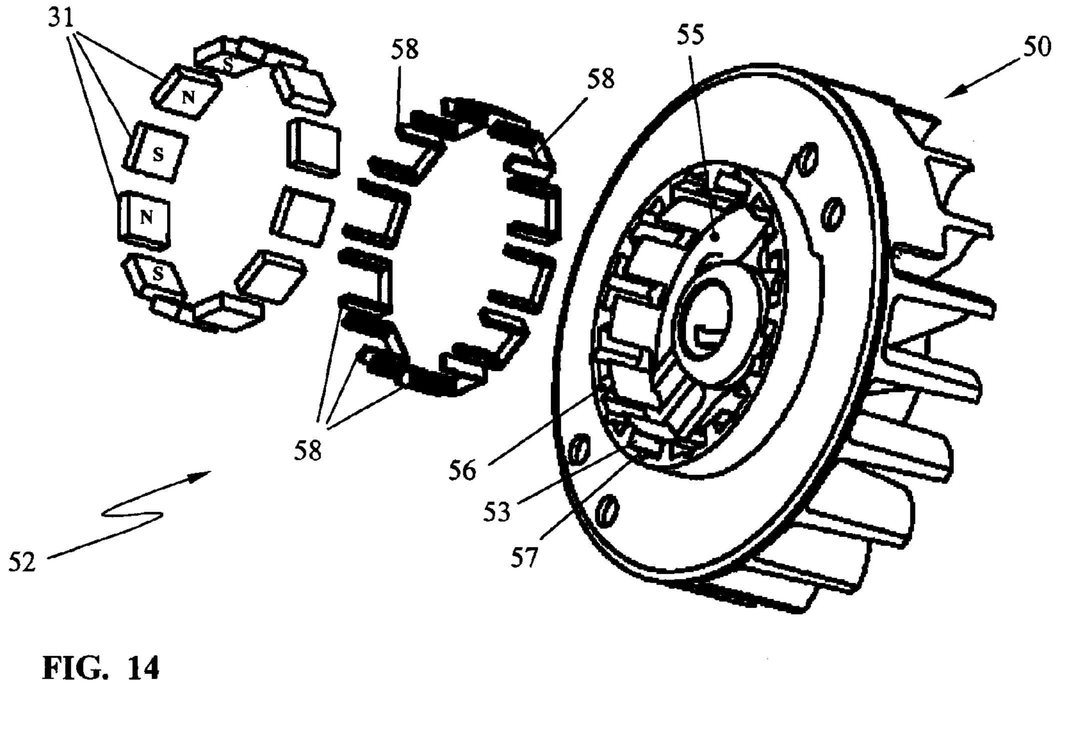
FIG. 14 is a view of the rear of a fan wheel with individual magnets clamped in the receiving recesses.

In FIGS. 12 to 14, further embodiments of the integration of the rotor 52 in a wheel member 50 of a fan wheel 51 are illustrated.

In the embodiments according to FIG. 12, the rim of the receiving cup 55 is embodied to be so thick that in its wall 56 individual receiving recesses 53 for insertion of permanent magnets 31 are formed. The spacing A of the permanent magnets 31 corresponds to 30° CA. The provided twelve permanent magnets 31 are distributed in corresponding receiving recesses 53 about the circumference of the receiving cup 55 in a uniform arrangement. The inner diameter $D_i$ of the receiving cup 55 is such that there is no collision risk relative to a correlated stator 40 that is covered by the rotor. The arrangement is such that the gap between the outer circumference 21 of the stator 40 and the inner circumference of the receiving cup 55 is minimized in order to ensure excellent magnetic interaction between the permanent magnets 31 and the claws 42 of the stator yoke.

The permanent magnets 31 inserted into the receiving recesses 53 are mechanically secured for which purpose the receiving recesses 53 are configured to be slightly smaller than the permanent magnets. In this way, the permanent magnets 31 are secured by a clamping action in their receiving recesses 53. As an additional securing action, in the provided cavities 57 of a receiving recess 53 an adhesive can be introduced.

In the embodiment according to FIG. 13, the receiving recesses 53 are open in a radial inward direction and a radial outward direction. The receiving recesses 53 are closed by annular magnetic yoke 32 so that improved magnetic flux can be obtained. The yoke 32 also provides a securing action of the individual magnets 31 based on its magnetic forces. Expediently, the individual magnets 31 are embedded or potted in their receiving recesses 53, glued into them or secured in any other appropriate way.

In the embodiments according to FIG. 14, the receiving recesses 53 are slightly larger than the permanent magnets. For clamping the permanent magnets 31 in the receiving recesses 53 lateral plastic strips 58 are inserted. The strips 58 can be made from other material than plastic material. Otherwise, the configuration according to FIG. 14 corresponds to that of FIG. 12.

The embodiment of a stator 40 for a claw pole alternator as illustrated in FIGS. 15 to 18 is in principle the same as the stator configuration according to FIGS. 3 to 5. For attaching the stator 40, in deviation from the stator 40 of FIGS. 3 to 5, fastening tabs 46 are formed on the body of the coil support 20. The fastening tabs 46 extend radially as well as particularly axially away from the body of the coil support 20 past the outer circumference 47 of the stator 40. In this connection, the stator sheet metal pieces 41 are designed such that the fastening tabs 46 project through a cutout 48 in the correlated stator sheet metal piece 41.

A preferred unitary embodiment of the tabs 46 on the coil support 20 is illustrated especially well in the section view according to FIG. 18.

The embodiment according to FIGS. 19 to 22 corresponds in its basic configuration to the stator 40 according to the embodiment of FIGS. 15 to 18. In deviation from the latter embodiment, the stator yoke is formed not only from two intermeshing stator sheet metal pieces 40 but of a total of six stator sheet metal laminations 41*a*, 41*b*, 41*c*. In this connection, one pole or claw 42 is comprised of three claws parts 42*a*, 42*b*, 42*c* that are positioned adjacent to one another and stacked. This laminated configuration reduces the eddy currents in the stator yoke and leads to a reduction in heat loss.

Because of the laminated configuration, the coil support 20 is made narrower so that the axial size corresponds approximately to that required for a two-part sheet metal stator according to FIGS. 16 to 18.

The embodiment according to FIGS. 23 to 26 corresponds in its basic configuration to the stator 40 in accordance with the embodiment of FIGS. 15 to 18. In deviation from the latter embodiment, the stator yoke is of a laminated configuration and is comprised of four meshing stator sheet metal laminations 41*a* and 41*b*. Each claw (pole) 42 is comprised of two claw parts 42*a* and 42*b* that are stacked. This laminated configuration reduces the eddy currents in the stator yoke and leads to a reduction in heat loss.

For attaching the stator 40, outer radially projecting fastening tabs 46 are provided that each have a fastening opening for receiving a fastening screw. The fastening tabs 46 are positioned in a common plane that is approximately parallel to the crankcase wall. In this way, the stator 40 can be simply connected axially by screwing.

Figure 27:
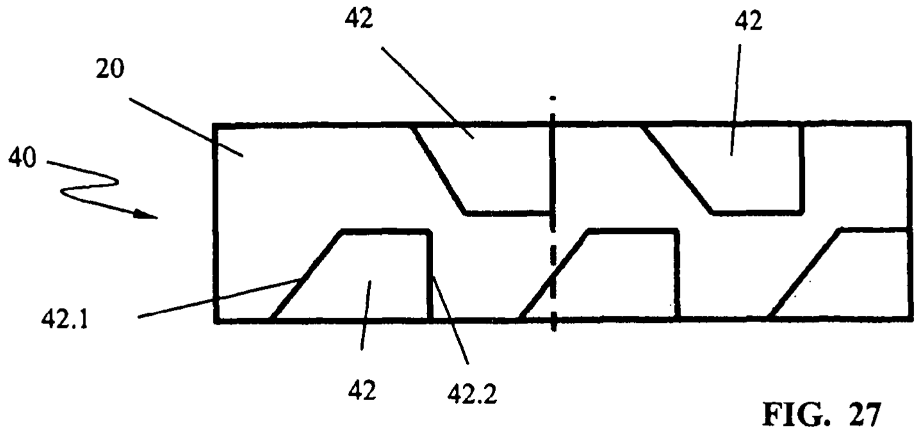
FIG. 27 shows a circumferential section of a stator in a plan view onto specially designed claw poles.
Figure 28:
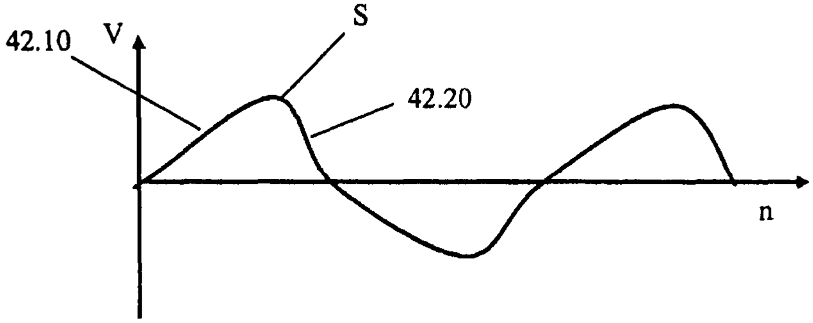
FIG. 28 shows the voltage course of the induced voltage of an alternator with claw configuration according to FIG. 27.

In order to be able to derive the rotational direction of the alternator 16 from the alternating voltage signal without great expenditure, the claws 42 are designed to be asymmetric relative to the rotational direction. FIG. 27 shows in a plan view onto a claw 42 the asymmetric shape of the claw that causes the induced alternating voltage signal S to be provided with an imprinted shape. This shape of the signal is illustrated in FIG. 28. The gentle slope of flank 42.10 is caused by the slanted portion 42.1 of the claw 42 while the steeply descending flank 42.20 is caused by the steep edge 42.2 of the claw 42. In one rotational direction, the half wave thus begins always with the gently increasing flank 42.10. When the rotational direction is reversed, the half wave will begin with a steep flank 42.20. The slope of the half wave thus enables recognition of the rotational direction.

Figure 29:
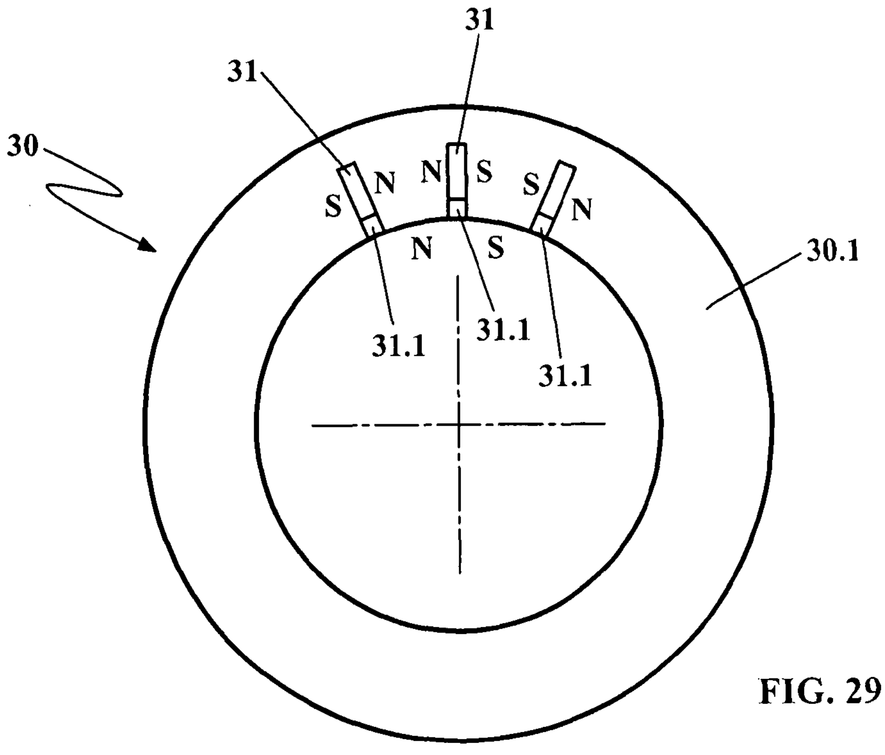
FIG. 29 shows an embodiment of a magnet ring of the rotor.

In FIG. 29 an alternative magnet ring is illustrated. Permanent magnets 31 are clamped such in adjacently positioned slots 31.1 of the magnetically conducting, particularly stamped, sheet metal ring 30.1 that same poles N, S in the circumferential direction are positioned opposite one another, respectively. In this way, between two slots 31.1 a corresponding magnet pole N or S is generated at the inner circumference of the sheet metal ring 30.1 The inner diameter of the magnet ring 30 can thus be fixed by a manufacturing tool in a simple way and a high inertia moment of the magnet ring 30 is obtained.

Figure 30:
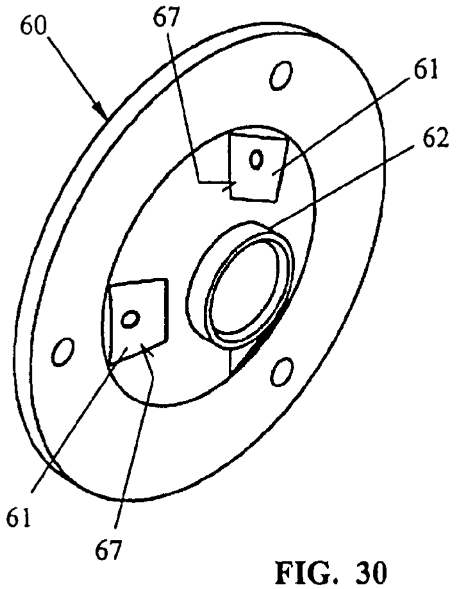
FIG. 30 is a perspective view of a baseplate for securing a stator having fastening tabs according to FIG. 16 or FIG. 20.

In order to be able to secure a stator 40 with fasting tabs 46 safely on the crankcase 3, the fastening plate 60 according to FIG. 30 is expedient. The fastening plate 60 can be integrated into the wall of the crankcase 3 or the wall of the crankcase 3 can be provided with corresponding fastening projections 61. The contact surface 67 of the fastening projections 61 is matched to the angle position of the fasting tabs 46. The angled configuration of the fasting tabs 46 ensures deep penetration of the stator 40 into the rotor 52 without the fasting tabs 46 colliding with the rim 59 of the rotor 52. For centering the stator, a cylindrical projection 62 is provided onto which the stator is pushed.

Figure 31:
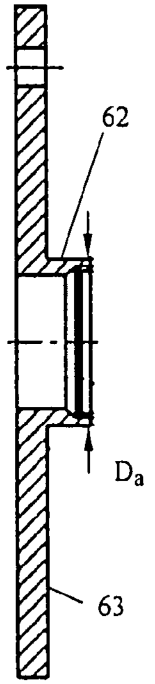
FIG. 31 is a section of a baseplate for securing a stator by means of a clamping part.
Figure 32:
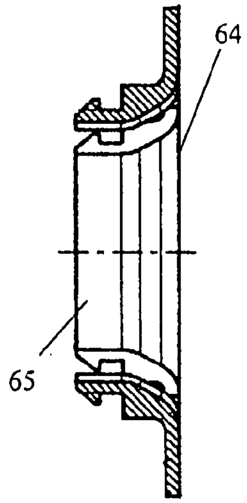
FIG. 32 is a detail illustration of a clamping part for snap-on attachment to the clamping part according to FIG. 31.

FIGS. 31 and 32 provide an alternative embodiment of a stator attachment. FIG. 31 shows in section a cylindrical projection 62 which can be provided on a fastening plate 63 or can be embodied unitarily directly on the wall of a crankcase 3. The outer diameter $D_a$ of the cylindrical projection 62 is matched to the inner diameter $d_i$ (FIG. 21) of the stator 40 so that the stator 40 essentially is received without radial play on the cylindrical projection 62.

As a locking element, a snap-on nut 64 according to FIG. 32 is provided; it has snap-on tongues 65 that engage the cylindrical projection 62 and lock thereon. The snap-on nut 64 secures in this way a stator pushed onto the cylindrical projection 62 in the axial direction. Expediently, for a rotational fixation a stop in the circumferential direction is provided. It is generally advantageous to secure the stator with a locking connection such as an advantageous snap-on attachment on a component, for example, the crankcase.

Figure 33:
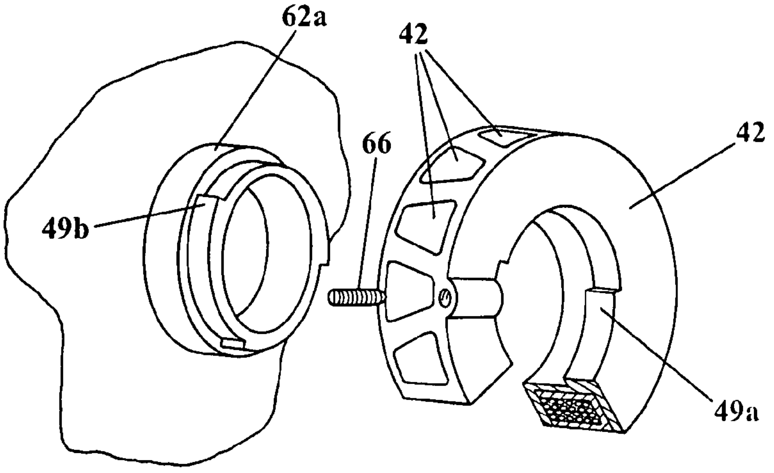
FIG. 33 is a schematic illustration of a wedging connection between the baseplate and the stator.

In the embodiment according to FIG. 33, the stator 40 is embedded in a potting compound, in particular, plastic material. During the step of embedding, a wedge configuration with wedges 49*a* is provided on the inner circumference that have correlated therewith a corresponding wedge geometry on a cylindrical projection 62*a*. The stator 40 is axially pushed onto the cylindrical projection 62*a* and then rotated until the circumferential wedge 49*a* interacts by clamping with the circumferential wedge 49*b* of the cylindrical projection to provide a wedging connection. The stator 40 is secured in particular by a self-looking frictional connection on the cylindrical projection 62*a*. For a safe rotational fixation, a securing pin 66 is expediently screwed in; it penetrates with its tip radially into the cylindrical projection 62*a*. In this way, an assembly-friendly attachment, for example, on the wall of the crankcase 3, is possible. The cylindrical projection 62*a* is advantageously integrally formed by casting.

Figure 34:
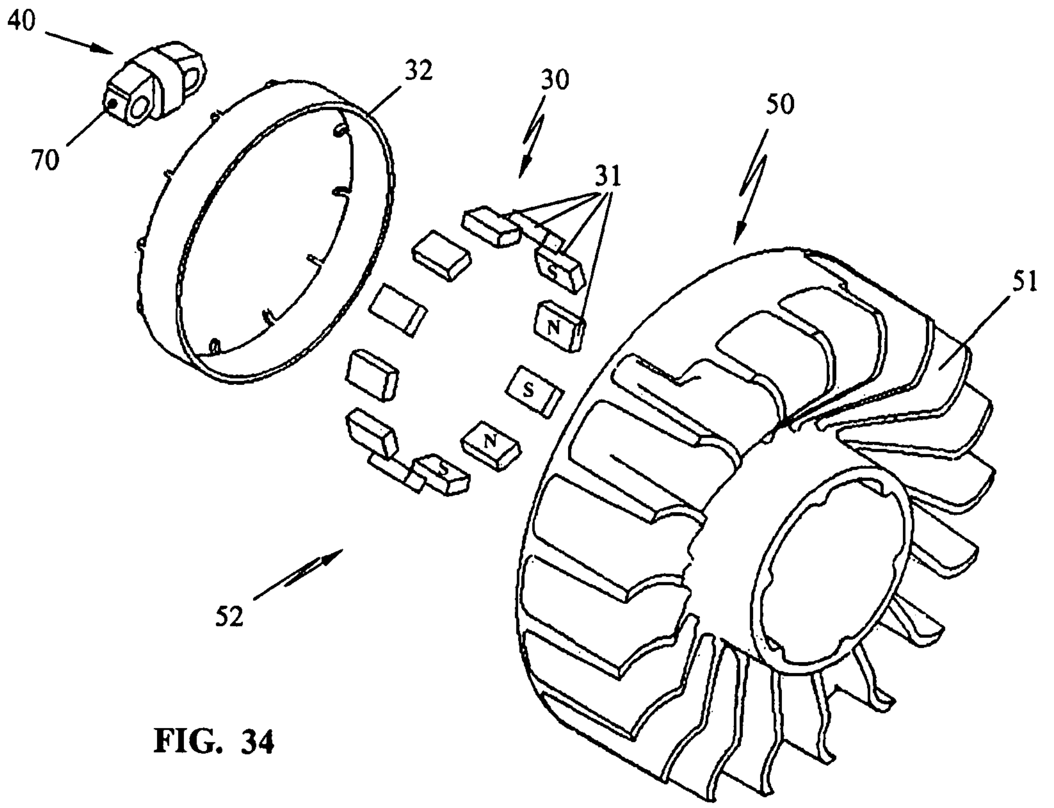
FIG. 34 is a schematic illustration of an alternator with a two-pole stator.
Figure 35:
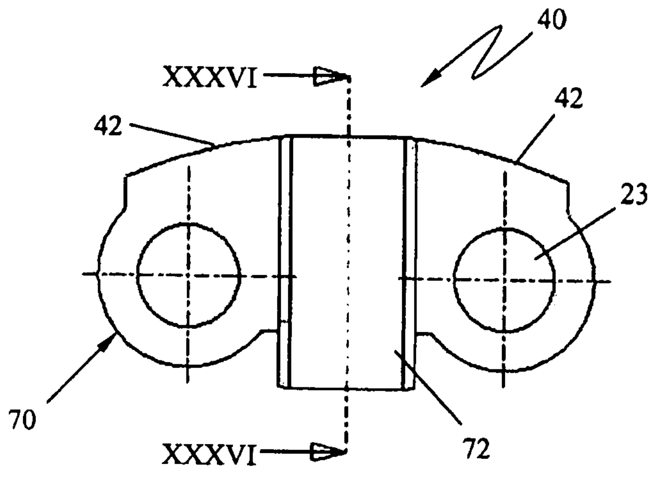
FIG. 35 is an end view of the stator according to FIG. 34.
Figure 36:
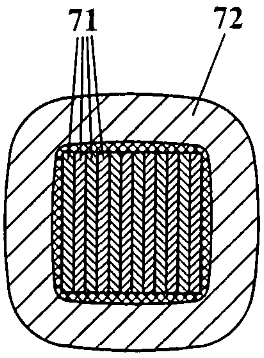
FIG. 36 is a section along the section line XXXVI-XXXVI of FIG. 35.

In the embodiment according to FIGS. 34 to 36 the stator 40 is reduced to a stator yoke 70 that extends in the circumferential direction across the n-th portion of a crankshaft revolution. The stator yoke 70 extends across such a circumferential angle that two magnets 31 of the magnet ring 30 can effect magnetic flux in the stator yoke 70. Since the magnet ring 30 has twelve permanent magnets 31 that are arranged in the circumferential direction at identical spacing relative to one another, the spacing between neighboring permanent magnets 31 is 30° CA. It is thus sufficient when the stator yoke extends in the circumferential direction across at least 30° CA. The coil support 72 is penetrated by the stator yoke 70 as illustrated in FIGS. 35 and 36. FIG. 36 also illustrates that the stator yoke 70 is of a laminated configuration, i.e., is comprised of individual sheet metal laminations 71. The coil support 72 surrounds the sheet metal laminations and receives an induction coil in which, by the rotating magnet ring 30, a voltage is induced as a result of the alternating magnetic flux; the voltage corresponds to the idealized alternating voltage signal S of FIG. 9.

Figure 37:
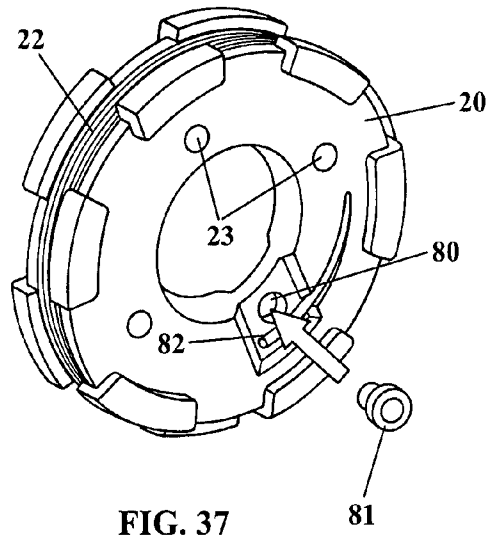
FIG. 37 is a perspective illustration of a coil support with wound coiled.

In addition to the constructive configuration of the stator and the rotor a mechanically loadable, safe electric connection of the signal line for tapping the alternating voltage signal S at the induction coil is required. In the embodiment according to FIGS. 37 to 39 in the coil support 20 a receptacle 80 for a metallic hollow rivet 81 is provided. The wire of the coil end 82 is stripped off its insulation and placed underneath the hollow rivet 81 and fixedly riveted in the coil support. In this way, an electric connection between the wire of the coil and the electrically conducting hollow rivet 81 is produced that, in turn, is secured in the electrically insulating coil support 20. The coil support 20 is comprised expediently of plastic material.

Figure 39:
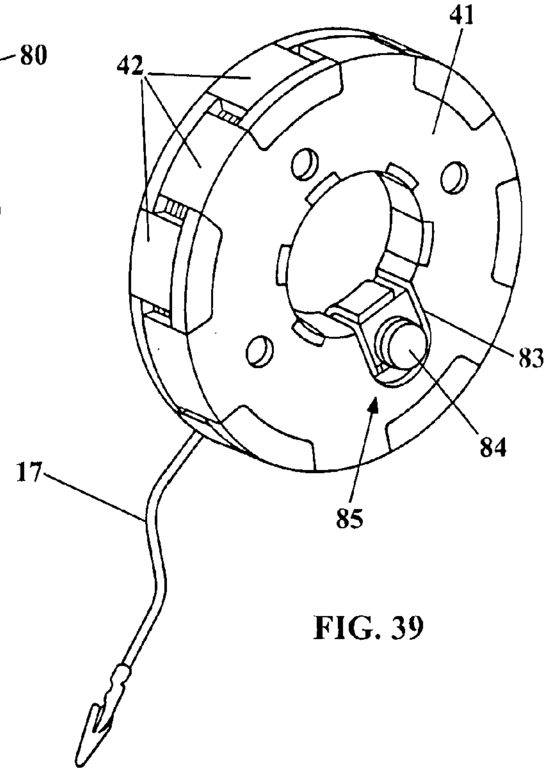
FIG. 39 is a perspective illustration of the stator according to FIG. 37 with a connector for a signal line.
Figure 38:
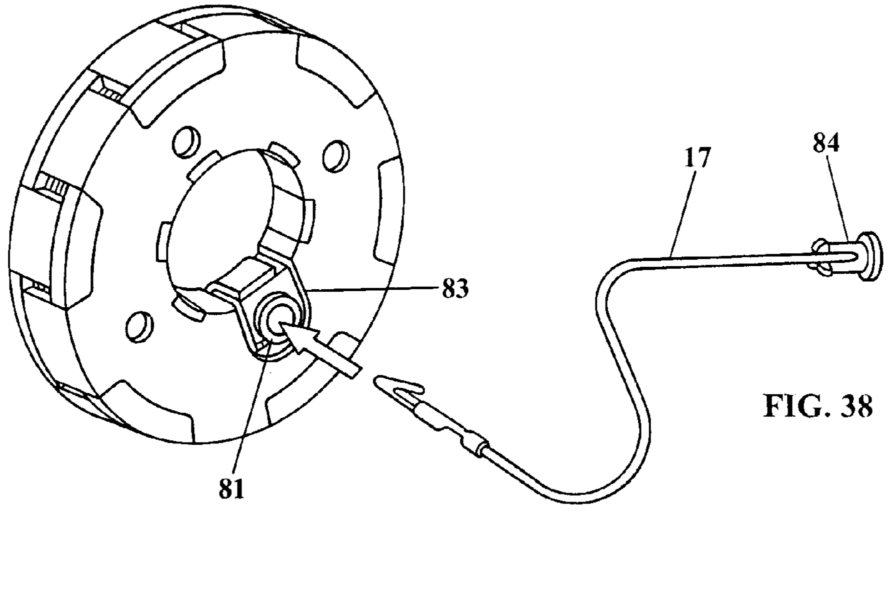
FIG. 38 shows the stator according to FIG. 37 with signal line.

After arranging the stator sheet metal pieces 41 on the coil support, one of which has a corresponding cutout 83 in the area of the hollow rivet 81, an electrical signal line 17 is threaded through the hollow rivet 81 (FIG. 39). The signal line 17 has at the remote end an electrically conducting plug 84 connected to the line 70 that is placed onto the hollow rivet 81 (FIGS. 38, 39). The plug 84 in the hollow rivet 81 provides the electric connection to the coil end 82 to the signal line 17 in the manner of a plug-in contact.

Figure 40:
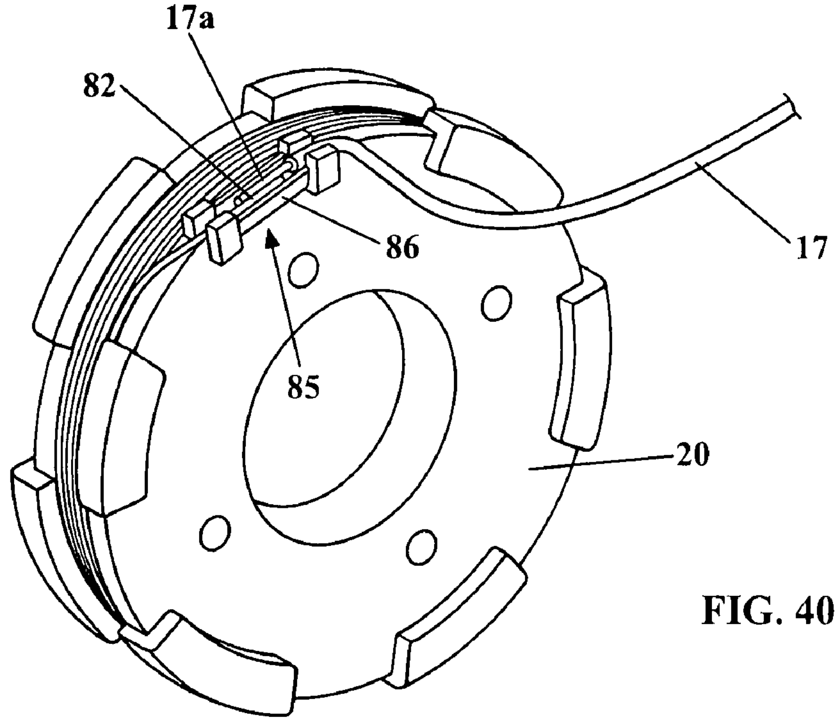
FIG. 40 is a perspective illustration of coil support with electrical connecting part secured on the coil support.
Figure 41:
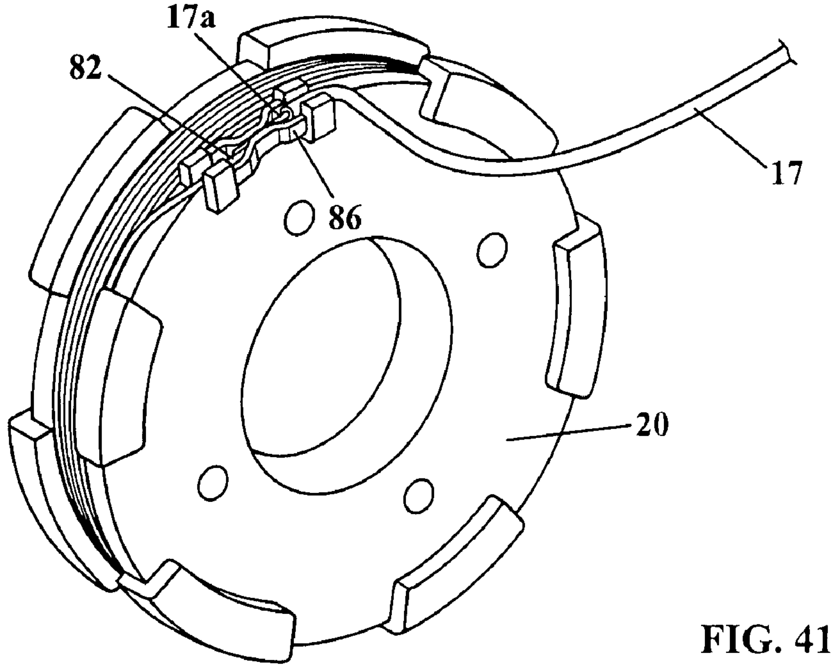
FIG. 41 is a perspective illustration of the coil support according to FIG. 40 with signal line connected to the coil.

In the embodiment according to FIGS. 40 and 41, at the rim of the coil support 20 an electric connecting part 85 is secured in the material of the coil support 20; expediently, it is located in the circumferential direction between two claws of the stator sheet metal. The connecting part 85 is advantageously embodied as a crimp connector 86 into which, on the one hand, the end 82 of the coil and, on the other hand, the end 17*a* of the signal line 17 are inserted. Once both stripped wire ends are inserted, the crimp connection 86 is crimped, as illustrated in FIG. 41, so that a mechanical fixed electrically conducting connection between end 82 of the coil and signal line 17 is produced.

In the embodiment according to FIGS. 42 to 44, a type of wire-wrap technology is employed for connecting the coil 22 to the signal line 17. The end 82 of the coil 22 is wound onto an electrical connector in the form of a pin 87 that is secured in the coil support 20 and extends axially from its end face. The pin 87 and the coil support 20 can be a unitary part. A female plug 88 is correlated with the pin 87 and is attached electrically conducting to the end 17*a* of the signal line 17. The female plug 88 is placed onto the pin 87 (FIG. 43) and the plug contacts 89 contact electrically the end 82 of the coil wire.

The female plug 88 placed onto the pin 87 is received with lateral securing tabs 90 in corresponding recesses 20*a* and 20*b* of the coil support 20 that extend in the circumferential direction to the right and to the left away from the pin 87. When the stator sheet metal pieces 41 are mounted, claw sections engage across the tabs 90 positioned in the recesses 20*a* and 20*b* so that the female plug 88 is secured positively on the stator 40.

Figure 45:
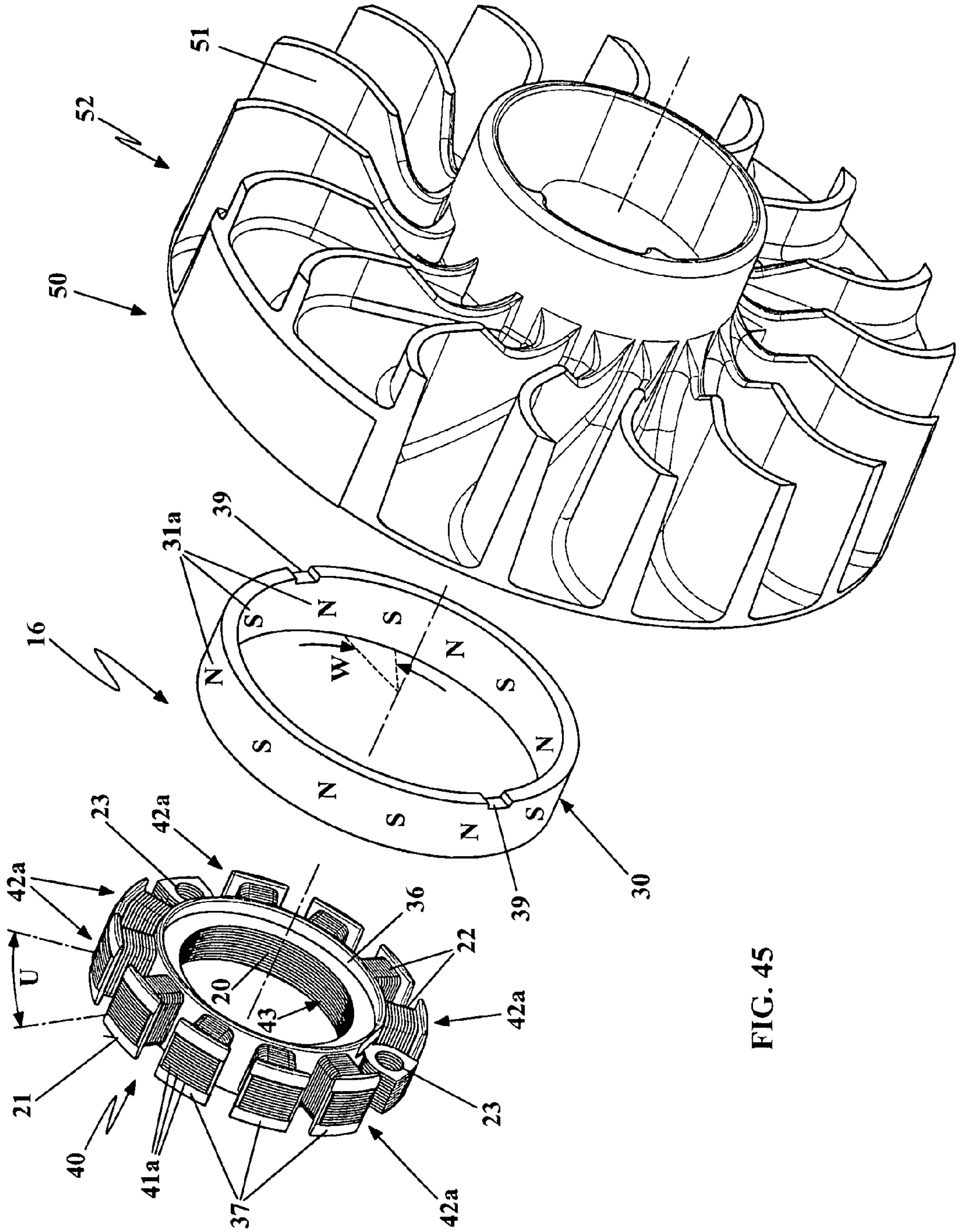
FIG. 45 is a schematic illustration of an alternator embodied as a radial alternator.

In the embodiment according to FIG. 45, the alternator 16 is configured as a radial alternator, i.e., an alternator 16 with poles 42 that are oriented radially in a star shape. The coil support 20 of the stator 40 is comprised of a lamination pack of individual sheet metal laminations 41*a* wherein the individual laminations 41*a* are stacked axially. The lamination pack has individual post-shaped coil supports that extend radial outwardly to the outer circumference 21. The posts form poles 42*a* and serve as supports of induction coils 22 of which at least one is arranged on each of the post-shaped poles 42*a*. In the illustrated embodiment a total of twelve posts are provided that are spaced relative to one another in the circumferential direction at an identical spacing U of preferably 30°.

For attaching the stator 40, two axial fastening openings 23 are provided in two of the posts that are positioned approximately opposite one another; the fastening openings 23 penetrate the sheet metal laminations 41*a* and are provided for receiving fastenings screws with which the stator 40 is attached fixedly to the crankcase, for example. The posts with the fastening openings 23 have no coil.

The rotor 40 is advantageously embedded (potted) for which purpose a cylindrical base plate 36 is attached to the base of the post-shaped poles 42*a*; this base plate 36 projects axially past the end faces of the lamination pack. Accordingly, the free ends of the posts support end plates 37 whose axial length corresponds to the axial height of the cylindrical base plate 36. The space between the base plate 36 and the end plates 37 is filled with a potting compound or the like. In this way, the coils are secured on the individual post-shaped poles 42*a* and secured against mechanical damage.

The position of the posts with the fastening openings 23 is selected such that, in the circumferential direction, on one side four poles 42*a* and on the other side six poles 42*a* are positioned between them. The summation signal of the coils 22 connected to one another corresponds to the alternating signal S as illustrated in FIG. 9.

The rotor 52, as in the preceding embodiments, is comprised of a wheel member 50 that, in the illustrated embodiment is a fan wheel 51 of an internal combustion engine. On the side facing the stator 40, a receiving cup 55 is formed on the fan wheel 51, as illustrated in FIGS. 11 through 14. A magnet ring 30 is inserted into the receiving cup 55. In the circumferential direction, the magnet ring 30 is magnetized alternatingly as a north pole and a south pole at identical spacings W to one another. In this way, about the circumference twelve permanent magnets 31 are created. For ensuring the correct rotational position of the magnet ring 30 in the receiving cup 55, locking grooves 39 are provided at one end face. The position of the magnet ring 30 relative to the position of the crankshaft is determined by means of these locking grooves 39.

In the mounted state, the inner circumference of the unitary magnet ring 30 is positioned at a minimal spacing about the outer circumference 21 of the stator 40. The stator 40 is positioned completely within or inside the magnet ring 30. When the rotor 52 rotates, the alternating magnetization of the magnet ring 30 causes alternating flux in the poles 42*a* so that an alternating voltage signal S is induced as illustrated in FIG. 9.

The specification incorporates by reference the entire disclosure of German priority document 10 2006 038 275.7 having a filing date of 16 Aug. 2006.

While specific embodiments of the invention have been shown and described in detail to illustrate the inventive principles, it will be understood that the invention may be embodied otherwise without departing from such principles.

What is claimed is:

1. An internal combustion engine comprising:

a combustion chamber having a spark plug arranged thereat;

a crankcase supporting a crankshaft;

intake means for introducing fuel and combustion air into the combustion chamber;

an exhaust for exhausting combustion gases from the combustion chamber;

a piston connected to the crankshaft and driving the crankshaft in rotation;

a wheel member connected to the crankshaft and rotating with the crankshaft;

an alternator driven by the crankshaft and supplying electric power to a consumer;

wherein the alternator is arranged within a radial boundary of the wheel member and external to the crankcase;

wherein the alternator has a stator and a rotor, wherein the crankshaft penetrates the stator and wherein the rotor is fixedly connected to the wheel member;

wherein the rotor is a magnet ring covering the stator;

wherein the stator is arranged essentially within an outer contour of the wheel member and wherein the magnet ring comprises magnets arranged in receiving recesses.

2. The internal combustion engine according to claim 1, wherein the wheel member is provided by a part of a clutch connected to the crankshaft for providing a drive connection to a tool.

3. The internal combustion engine according to claim 1, wherein the wheel member is provided by a fan wheel and wherein the rotor is connected to the fan wheel on a side of the fan wheel facing the crankcase.

4. The internal combustion engine according to claim 1, wherein the rotor is integrated into the wheel member.

5. The internal combustion engine according to claim 1, wherein the receiving recesses are provided in the wheel member.

6. The internal combustion engine according to claim 1, further comprising a support ring for the magnets, wherein the receiving recesses are provided in the support ring and wherein the support ring is inserted into a receiving cup of the wheel member.

7. The internal combustion engine according to claim 6, wherein the support ring is a plastic ring.

8. The internal combustion engine according to claim 1, wherein the magnets are secured in the receiving recesses by gluing.

9. The internal combustion engine according to claim 1, further comprising an annular magnetic yoke surrounding the magnet ring.

10. The internal combustion engine according to claim 1, wherein the alternator is an ignition angle transducer and an energy source.

11. The internal combustion engine according to claim 1, wherein the stator comprises a coil support and a stator yoke having poles, wherein the coil support is enclosed by the stator yoke and wherein the poles are arranged on an outer circumference of the stator yoke.

12. The internal combustion engine according to claim 11, wherein the stator yoke is comprised of at least two sheet metal pieces arranged on a first end face and a second end face of the coil support, wherein the poles are located on an outer circumference of the coil support and wherein the at least two sheet metal pieces engage one another at an inner circumference of the coil support so as to be flux-conducting.

13. The internal combustion engine according to claim 12, wherein the at least two sheet metal pieces are connected positively at the inner circumference.

14. The internal combustion engine according to claim 12, wherein the at least two sheet metal pieces engage one another frictionally at the inner circumference.

15. The internal combustion engine according to claim 11, wherein a spacing between two of the poles positioned adjacent to one another matches an n-th portion of a crankshaft revolution, wherein n is an integer in a range from 6 to 24.

16. The internal combustion engine according to claim 15, wherein the stator has twelve of the poles and wherein the twelve poles are uniformly distributed about the circumference of the coil support.

17. The internal combustion engine according to claim 1, wherein the stator has claws forming poles and wherein the claws in a plan view have an asymmetric configuration generating an alternating signal that enables detection of rotational direction of the rotor.

18. The internal combustion engine according to claim 1, wherein the alternator is a claw pole alternator.

19. The internal combustion engine according to claim 1, wherein the alternator is a radial alternator.

20. The internal combustion engine according to claim 1, wherein the alternator is embodied as a starter motor.

21. The internal combustion engine according to claim 20, wherein the alternator has a first operating mode and a second operating mode, wherein in the first operating mode the alternator functions as at least one of an energy source and an ignition angle transducer, and wherein in the second operating mode the alternator functions as a starter motor for starting the internal combustion engine.

22. An internal combustion engine comprising:

a combustion chamber having a spark plug arranged thereat;

a crankcase supporting a crankshaft;

intake means for introducing fuel and combustion air into the combustion chamber;

an exhaust for exhausting combustion gases from the combustion chamber;

a piston connected to the crankshaft and driving the crankshaft in rotation;

a wheel member connected to the crankshaft and rotating with the crankshaft;

an alternator driven by the crankshaft and supplying electric power to a consumer;

wherein the alternator is arranged within a radial boundary of the wheel member and external to the crankcase;

wherein the alternator has a stator and a rotor, wherein the crankshaft penetrates the stator and wherein the rotor is fixedly connected to the wheel member;

wherein the stator comprises a coil support and a stator yoke having poles, wherein the coil support is enclosed by the stator yoke and wherein the poles are arranged on an outer circumference of the stator yoke;

wherein a spacing between two of the poles positioned adjacent to one another matches an n-th portion of a crankshaft revolution, wherein n is an integer in a range from 6 to 24;

wherein an angle position of the stator on the crankcase and top dead center of the piston are aligned with one another such that a zero crossing of a voltage signal of the alternator coincides with top dead center of the piston.

23. An internal combustion engine comprising:

a combustion chamber having a spark plug arranged thereat;

a crankcase supporting a crankshaft;

intake means for introducing fuel and combustion air into the combustion chamber;

an exhaust for exhausting combustion gases from the combustion chamber;

a piston connected to the crankshaft and driving the crankshaft in rotation;

a wheel member connected to the crankshaft and rotating with the crankshaft;

an alternator driven by the crankshaft and supplying electric power to a consumer;

wherein the alternator is arranged within a radial boundary of the wheel member and external to the crankcase;

wherein the alternator has a stator and a rotor, wherein the crankshaft penetrates the stator and wherein the rotor is fixedly connected to the wheel member;

wherein the stator comprises a coil support and a stator yoke having poles, wherein the coil support is enclosed by the stator yoke and wherein the poles are arranged on an outer circumference of the stator yoke;

wherein the stator yoke is comprised of at least two sheet metal pieces arranged on a first end face and a second end face of the coil support, wherein the poles are located on an outer circumference of the coil support and wherein the at least two sheet metal pieces engage one another at an inner circumference of the coil support so as to be flux-conducting;

wherein the coil support has fastening means attaching the stator to the crankcase.

24. The internal combustion engine according to claim 23, wherein the rotor is a magnet ring covering the stator.

25. The internal combustion engine according to claim 24, wherein the stator is arranged essentially within an outer contour of the wheel member and wherein the magnet ring comprises magnets arranged in receiving recesses.

26. The internal combustion engine according to claim 23, wherein the fastening means are fastening tabs that project radially outwardly from a body of the coil support past an outer circumference of the body of the coil support.

27. The internal combustion engine according to claim 26, wherein the fastening tabs project through a cutout in one of the at least two sheet metal pieces, respectively.

28. The internal combustion engine according to claim 26, wherein the fastening tabs are unitarily formed on the coil support.

29. The internal combustion engine according to claim 23, wherein the fastening means are embodied as a circular wedging connection, wherein on an inner circumference of the stator a circular wedge configuration is provided.

30. An internal combustion engine comprising:

a combustion chamber having a spark plug arranged thereat;

a crankcase supporting a crankshaft;

intake means for introducing fuel and combustion air into the combustion chamber;

an exhaust for exhausting combustion gases from the combustion chamber;

a piston connected to the crankshaft and driving the crankshaft in rotation;

a wheel member connected to the crankshaft and rotating with the crankshaft;

an alternator driven by the crankshaft and supplying electric power to a consumer;

wherein the alternator is arranged within a radial boundary of the wheel member and external to the crankcase;

wherein the alternator has a stator and a rotor, wherein the crankshaft penetrates the stator and wherein the rotor is fixedly connected to the wheel member;

wherein the stator comprises a coil support and a stator yoke having poles, wherein the coil support is enclosed by the stator yoke and wherein the poles are arranged on an outer circumference of the stator yoke;

wherein the stator yoke is comprised of at least two sheet metal pieces arranged on a first end face and a second end face of the coil support, wherein the poles are located on an outer circumference of the coil support and wherein the at least two sheet metal pieces engage one another at an inner circumference of the coil support so as to be flux-conducting;

wherein a first end of a coil of the stator is connected to one of the at least two sheet metal pieces and wherein a second end of the coil is connected to a signal line.

31. The internal combustion engine according to claim 30, wherein said one sheet metal piece is secured to the crankcase so as to be grounded.

32. The internal combustion engine according to claim 30, comprising an electrically conducting hollow rivet that is inserted into the coil support, wherein the hollow rivet is connected to the second end of the coil, and further comprising a plug connected to the signal line and inserted into the hollow rivet.

33. The internal combustion engine according to claim 30, further comprising an electrical connecting part secured on the coil support, wherein the connecting part electrically connects the second end of the coil and one end of the signal line.

34. The internal combustion engine according to claim 33, wherein the connecting part is a crimp connector.

35. The internal combustion engine according to claim 30, further comprising an electrical connector that is a pin secured on the coil support onto which pin the second end of the coil is wound, wherein the signal line has a plug for receiving the pin, wherein the plug has inner plug contacts that electrically contact the second end of the coil when the plug is pushed onto the pin.

36. The internal combustion engine according to claim 35, wherein the plug is secured on the sheet metal piece by one of the at least two sheet metal pieces.

37. The internal combustion engine according to claim 12, wherein one of the at least two sheet metal pieces is comprised of at least two laminations wherein claw parts of the at least two laminations forming the poles are positioned adjacent to one another or are stacked.

* * * * *